United States Patent

Nagaoka et al.

[11] Patent Number: 5,960,449
[45] Date of Patent: Sep. 28, 1999

[54] DATABASE SYSTEM SHARED BY MULTIPLE CLIENT APPARATUSES, DATA RENEWAL METHOD, AND APPLICATION TO CHARACTER PROCESSORS

[75] Inventors: Hiroshi Nagaoka; Seiji Kuwari; Masaaki Hayashi; Yasunari Yamashita; Ayato Matsuo, all of Kyoto, Japan

[73] Assignee: Omron Corporation, Kyoto, Japan

[21] Appl. No.: 08/676,293

[22] PCT Filed: Nov. 21, 1995

[86] PCT No.: PCT/JP95/02371

§ 371 Date: Nov. 21, 1996

§ 102(e) Date: Nov. 21, 1996

[87] PCT Pub. No.: WO96/16374

PCT Pub. Date: May 30, 1996

[30] Foreign Application Priority Data

Nov. 21, 1994 [JP] Japan .................................. 6-286865
Mar. 30, 1995 [JP] Japan .................................. 7-073942

[51] Int. Cl.⁶ .................................................. G06F 17/21
[52] U.S. Cl. ............................................ 707/532; 704/10
[58] Field of Search ........................... 707/10, 201, 203, 707/532; 704/10

[56] References Cited

U.S. PATENT DOCUMENTS

| | | | |
|---|---|---|---|
| 4,771,385 | 9/1988 | Egami et al. | 707/532 |
| 5,060,184 | 10/1991 | Sakai | 707/532 |
| 5,079,701 | 1/1992 | Kuga et al. | 704/10 |
| 5,682,543 | 10/1997 | Shiomi | 707/532 |

FOREIGN PATENT DOCUMENTS

| | | |
|---|---|---|
| 60-204065 | 10/1985 | Japan . |
| 1-241621 | 9/1989 | Japan . |
| 2-58165 | 2/1990 | Japan . |
| 4-112260 | 4/1992 | Japan . |
| 6-162070 | 6/1994 | Japan . |
| 7-182333 | 7/1995 | Japan . |

Primary Examiner—Joseph H. Feild
Attorney, Agent, or Firm—Dickstein Shapiro Morin & Oshinsky, LLP

[57] ABSTRACT

In a database system that connects a plurality of user database apparatus to a host database apparatus, the database system judges whether a data record stored in each user database satisfies a condition for being registered in the host database, and stores the data record if it satisfies the condition. The renewal and registration processing is performed for all data records of all user databases to register all data records that satisfies the registration condition. The data records registered in the host database are deleted from user databases.

The database system can be applied to a system consists having a shared dictionary and user dictionaries such as a Japanese language word processor, English language word processor, and a mechanical translator.

20 Claims, 28 Drawing Sheets

Fig.3

User 1 table

| Name | Company | Office phone | Home phone |
|---|---|---|---|
| 長岡宏<br>(Nagaoka Hiroshi) | ナガオカヤ<br>(Nagaokaya) | 075-957-9815 | 075-111-2222 |
| 田中一<br>(Tanaka Hajime) | タナカヤ<br>(Tanakaya) | 03-1111-2222 | 03-2222-3333 |
| 斉藤茂吉<br>(Saitoh Mokichi) | 第一電気<br>(Daiichidenki) | 06-222-3333 | 06-333-4444 |
| ⋮ | ⋮ | ⋮ | ⋮ |

User 2 table

| Name | Company | Office phone | Home phone |
|---|---|---|---|
| 長岡宏<br>(Nagaoka Hiroshi) | ナガオカヤ<br>(Nagaokaya) | 075-957-9815 | 075-111-2222 |
| 山本太郎<br>(Yamamoto Taroh) | ヤマモトヤ<br>(Yamamotoya) | 06-123-4567 | 06-345-6789 |
| 鈴木花子<br>(Suzuki hanako) | ハナコヤ<br>(Hanakoya) | 03-1234-5678 | 03-2345-6789 |
| ⋮ | ⋮ | ⋮ | ⋮ |

⋮

User N table

| Name | Company | Office phone | Home phone |
|---|---|---|---|
| 田中一<br>(Tanaka Hajime) | タナカヤ<br>(Tanakaya) | 03-1111-2222 | 03-2222-3333 |
| 夏目漱石<br>(Natsume Sohseki) | 第一出版<br>(Daiichishupan) | 03-4321-9876 | 03-5432-8765 |
| 島崎藤村<br>(Shimazaki Tohson) | 出版堂<br>(Shupandoh) | 06-9876-5432 | 06-7654-3210 |
| ⋮ | ⋮ | ⋮ | ⋮ |

Additional system shared table (no)

| Name | Company | Office phone | Home phone |
|---|---|---|---|
|  |  |  |  |

Fig.4

User 1 table

| Name | Company | Office phone | Home phone |
|---|---|---|---|
| 斉藤茂吉<br>(Saitoh Mokichi)<br>⋮ | 第一電気<br>(Daiichidenki)<br>⋮ | 06-222-3333<br>⋮ | 06-333-4444<br>⋮ |

User 2 table

| Name | Company | Office phone | Home phone |
|---|---|---|---|
| 山本太郎<br>(Yamamoto Taroh)<br>鈴木花子<br>(Suzuki hanako)<br>⋮ | ヤマモトヤ<br>(Yamamotoya)<br>ハナコヤ<br>(Hanakoya)<br>⋮ | 06-123-4567<br>03-1234-5678<br>⋮ | 06-345-6789<br>03-2345-6789<br>⋮ |

⋮

User N table

| Name | Company | Office phone | Home phone |
|---|---|---|---|
| 夏目漱石<br>(Natsume Sohseki)<br>島崎藤村<br>(Shimazaki Tohson)<br>⋮ | 第一出版<br>(Daiichishupan)<br>出版堂<br>(Shupandoh)<br>⋮ | 03-4321-9876<br>06-9876-5432<br>⋮ | 03-5432-8765<br>06-7654-3210<br>⋮ |

Additional system shared table

| Name | Company | Office phone | Home phone |
|---|---|---|---|
| 長岡宏<br>(Nagaoka Hiroshi)<br>田中一<br>(Tanaka Hajime) | ナガオカヤ<br>(Nagaokaya)<br>タナカヤ<br>(Tanakaya) | 075-957-9815<br>03-1111-2222 | 075-111-2222<br>03-2222-3333 |

40 Portable info. terminal

Fig.7

| Main database file |||||
|---|---|---|---|---|
| Name | Office Phone | Home phone | Freq. of use | Additional data |
| 山田花子<br>(Yamada Hanako) | 03-1212-3232 | 03-2132-9898 | 5 | 0 |
| 山下太郎<br>(Yamashita Taroh) | 075-789-9876 | 075-543-9696 | 27 | 0 |
| 下田道子<br>(Shimoda Michiko) | 06-7777-9595 | 06-2132-6461 | 20 | 0 |
| 大木聡美<br>(Ohki Satomi) | 033-234-3636 | 033-655-9632 | 55 | 0 |
| ⋮ | ⋮ | ⋮ | ⋮ | ⋮ |

Fig.8

| Subdata file of portable info. terminal 1 | | | |
|---|---|---|---|
| Name | Office phone | Home phone | Freq. of use |
| 岡本太郎<br>(Okamoto Taroh) | 075-333-3333 | 075-555-55555 | 30 |
| 齋田次郎<br>(Saida Jiroh) | 03-1234-4321 | 03-2222-2323 | 15 |
| 林三郎<br>(Hayashi Saburoh) | 06-5656-2323 | 06-7898-1111 | 5 |
| ⋮ | ⋮ | ⋮ | ⋮ |

| Subdata file of portable info. terminal 2 | | | |
|---|---|---|---|
| Name | Office phone | Home phone | Freq. of use |
| 齋田次郎<br>(Saida Jiroh) | 03-1234-4321 | 03-2222-2323 | 10 |
| 岡本太郎<br>(Okamoto Taroh) | 075-333-3333 | 075-555-55555 | 25 |
| 林三郎<br>(Hayashi Saburoh) | 06-5656-2323 | 06-7898-1111 | 30 |
| 久野四郎<br>(Kuno Shiroh) | 033-233-3232 | 033-656-3232 | 30 |
| ⋮ | ⋮ | ⋮ | ⋮ |

| Subdata file of portable info. terminal 3 | | | |
|---|---|---|---|
| Name | Office phone | Home phone | Freq. of use |
| 齋田次郎<br>(Saida Jiroh) | 03-1234-4321 | 03-2222-2323 | 5 |
| 岡本太郎<br>(Okamoto Taroh) | 075-333-3333 | 075-555-55555 | 27 |
| 中野五郎<br>(Nakano Goroh) | 06-5656-1333 | 06-7898-6666 | 20 |
| 久野四郎<br>(Kuno Shiroh) | 033-233-3232 | 033-656-3232 | 55 |
| ⋮ | ⋮ | ⋮ | ⋮ |

Fig. 9

| | | | | | | | | Subdatabase info. temporary memory | | |
|---|---|---|---|---|---|---|---|---|---|---|
| Name | Office Phone | Home phone | User 1 | Freq. 1 | User 2 | Freq. 2 | User 3 | Freq. 3 | Sum |
| 岡本太郎 (Okamoto Taroh) | 075-333-3333 | 075-555-55555 | PIT1 | 30 | PIT2 | 25 | PIT3 | 27 | 82 |
| 林三郎 (Hayashi Saburoh) | 06-5656-2323 | 06-7898-1111 | PIT2 | 30 | | | | | 30 |
| 久野四郎 (Kuno shiroh) | 033-233-3232 | 033-656-3232 | PIT2 | 30 | PIT2 | 55 | | | 85 |

Fig.10

| Main database file | | | | |
|---|---|---|---|---|
| Name | Office Phone | Home phone | Freq. of use | Additional data |
| 山田花子<br>(Yamada Hanako) | 03-1212-3232 | 03-2132-9898 | 5 | 0 |
| 山下太郎<br>(Yamashita Taroh) | 075-789-9876 | 075-543-9696 | 27 | 0 |
| 下田道子<br>(Shimoda Michiko) | 06-7777-9595 | 06-2132-6461 | 20 | 0 |
| 大木聡美<br>(Ohki Satomi) | 033-234-3636 | 033-655-9632 | 55 | 0 |
| 岡本太郎<br>(Okamoto Taroh) | 075-333-3333 | 075-555-55555 | 27 | 1 |
| ⋮ | ⋮ | ⋮ | ⋮ | ⋮ |

Fig. 15

(Proper noun)

| Kana | Kanji | User dict. No. | Total |
|---|---|---|---|
| ひろの (Hirono) | 広野 (Hirono) | 5 | 10 |
| くぼ (Kubo) | 窪 (Kubo) | 10 | 15 |
| . | . | . | . |
| . | . | . | . |
| . | . | . | . |

141 142 143 144

(Common noun)

| Kana | Kanji | User dict. No. | Total |
|---|---|---|---|
| . | . | . | . |
| . | . | . | . |
| . | . | . | . |

141 142 143 144

(Verb)

| Kana | Kanji | User dict. No. | Total |
|---|---|---|---|
| . | . | . | . |
| . | . | . | . |
| . | . | . | . |

| Part of speed | 1st ref. No. (User dict. No.) | 1st ref. No. (Total) |
|---|---|---|
| Proper noun | 3 | 10 |
| other nouns | 5 | 15 |
| verb | 10 | 20 |
| . | . | . |
| . | . | . |
| . | . | . |

151 152 153

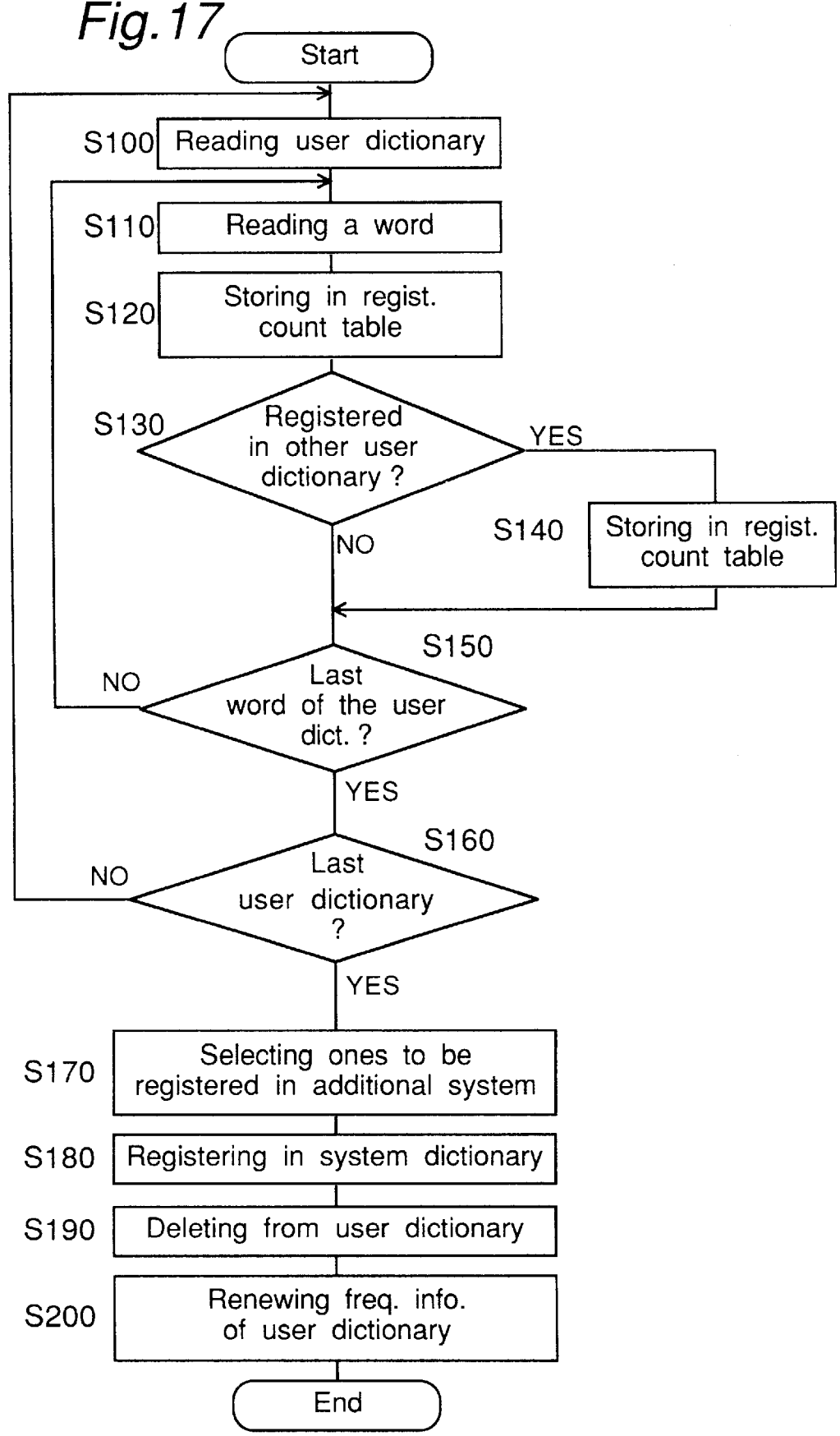

Fig. 18

System Dict. (Name)

| Kana | Kanji |
|---|---|
| ひろし (Hiroshi) | 宏 (Hiroshi) |
| ひろし (Hiroshi) | 博 (Hiroshi) |

User freq. info. in system dict.

| Value | |
|---|---|
| 50 | ← 宏 (Hiroshi) |
| 20 | ← 博 (Hiroshi) |

User Dict. (Name)  #i

| Kana | Kanji | Value |
|---|---|---|
| ひろし (Hiroshi) | 比呂志 (Hiroshi) | 200 |

Registered in plural user dict.

User freq. info. in system dict.

| Value | |
|---|---|
| 50 | ← 宏 (Hiroshi) |
| 20 | ← 博 (Hiroshi) |

User Dict. (Name)  #j

| Kana | Kanji | Value |
|---|---|---|
| ひろし (Hiroshi) | 比呂志 (Hiroshi) | 200 |

After registered in system dictionary
↓

System Dict. (Name)

| Kana | Kanji |
|---|---|
| ひろし (Hiroshi) | 宏 (Hiroshi) |
| ひろし (Hiroshi) | 博 (Hiroshi) |
| ひろし (Hiroshi) | 比呂志 (Hiroshi) |

User freq. info. in system dict.

| Value | |
|---|---|
| 50 | ← 宏 (Hiroshi) |
| 20 | ← 博 (Hiroshi) |
| 200 | ← 比呂志 (Hiroshi) |

User Dict. (Name)  #i

| Kana | Kanji | Value |
|---|---|---|
|  |  |  |

Deleted from plural user dict.

User freq. info. in system dict.

| Value | |
|---|---|
| 50 | ← 宏 (Hiroshi) |
| 200 | ← 博 (Hiroshi) |
| 20 | ← 比呂志 (Hiroshi) |

User Dict. (Name)  #j

| Kana | Kanji | Value |
|---|---|---|
|  |  |  |

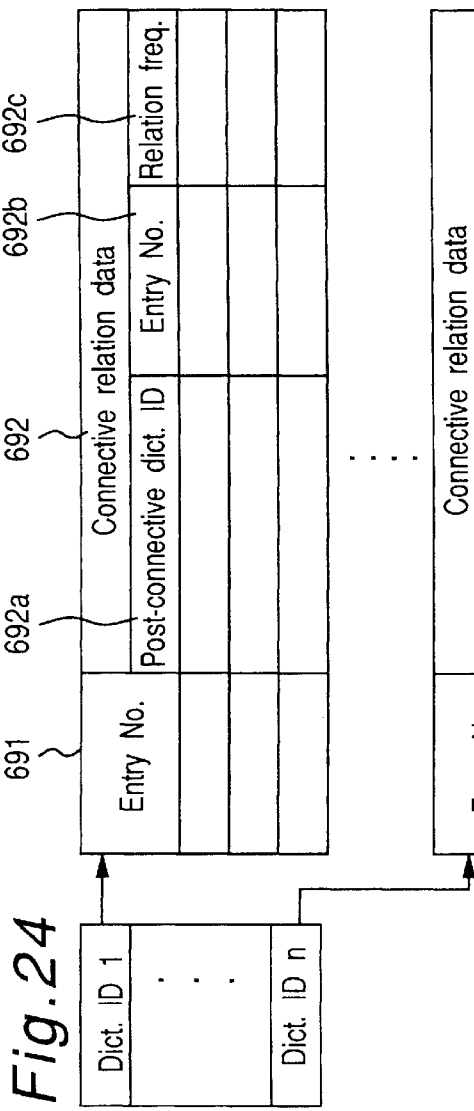

| | Pre-previous | Previous | Present | Reduction of relation freq. | |
|---|---|---|---|---|---|
| Pattern1 | • | → • | → • | Perform | Arrow shows transition of relation freq.<br>⟶ indicates unchanged<br>↘ indicates decreased |
| Pattern2 | • | ↘ • | → • | Perform | |
| Pattern3 | Other than patterns 1,2 | | | Not perform | |

DATABASE SYSTEM SHARED BY MULTIPLE CLIENT APPARATUSES, DATA RENEWAL METHOD, AND APPLICATION TO CHARACTER PROCESSORS

BACKGROUND OF THE INVENTION

1. Field of the Art

The present invention relates to a database system shared by multiple client apparatuses connected thereto by a network, and more particularly a database system that effectively takes into its database duplicate data redundantly created by client apparatuses and a method of constructing the database. Further, the present invention includes application to character processors.

2. Background Art

A database system connects to itself multiple client apparatuses, for example personal computers, through a network, and the client apparatuses share a database. Such a database system is well-known.

In a database system of this kind, data necessary for a user is sometimes not registered in the shared database. In such a case, the user creates its own data file using the memory of a client apparatus for individual use.

However, considering the whole system, the creation of individual data files on the part of users involves inefficiency described in the following.

It is a waste of resources as well as of time and labor, if multiple users own data of the same content redundantly in their data files. Further, a shared database becomes huge, and utilization efficiency declines, if all data supposed to be necessary is registered in the shared database beforehand to avoid such waste.

For example, consider a translation system in which a number of terminal computers are connected to a server computer that has a shared dictionary for translation. In this case, translation in various professional fields can be made possible, if the server computer has dictionaries specialized for various professional fields. However, all of these dictionaries are rarely used. Nevertheless, the dictionaries kept in the server system are often still insufficient in their contents, within an individual professional field. For example, natural science has many fields such as biology, medical, chemistry, mechanical, electrical, and electronics, etc. Further, each of these fields is further divided into many fields. Moreover, each field itself varies as research develops.

Therefore, such a demand for comprehensiveness is limitless, and the dictionaries of the server side cannot accommodate it. On the other hand, it is an exceedingly heavy burden for the users side to be completely equipped with their own dictionaries.

SUMMARY OF THE INVENTION

The object of the present invention is basically to solve the above problems in a database system shared by multiple apparatuses.

In order to achieve this objective, the present invention expands the server database by utilizing individual databases created in client apparatuses by themselves. That is, the server's database apparatus searches data registered in the users' databases, called user databases hereafter, to judge whether a particular data record should be registered in the server database. The criterion for the judgment may be the degree of importance or a feature amount given by the users for the record. The criterion also may be the degree of redundancy or the frequency in use of the record, or a combination of these two or three criteria.

Here a feature amount of a record is a parameter that adds a meaning that is different from the information of the record, for example, the degree of importance that each user can arbitrarily determine for the record, the frequency in use how often each user has accessed the record, or the number of registrations how many users have stored the record in user tables as data for individual use.

In any case, some records in user databases, which are worth being registered in the server database are taken into the server database, and the records registered in the server database are deleted from user databases. Each user database can effectively use its memory by these means.

According to the present invention, therefore, data of greater needs for the users can be effectively taken into the server database, so that the server database becomes enriched for sharing. As a result, effective use of the server database is prompted.

The processing of registering data in the server database described above is not necessarily periodically and automatically performed. For example, the operators may perform the processing of registration according to their own judgment.

As for the condition for registration or criterion for registration, it is not necessarily uniform and the same for all data. For example, the registration condition can be set depending on the classes of data, if the data is divided into a plurality of classes. Further, preferably, the condition can be altered as occasion demands. Amounts concerning data registration, such as the degree of importance of a data record, used for the registration condition are given by individual users. However, the judgment whether a particular data record should be registered or not is performed on the server side. Therefore, various kinds of flexibility can be maintained. For example, the registration of a data record in the server database is not performed, if the record is not redundantly registered, even if the degree of importance (feature amount) of the record is set at high level by a single user.

The present invention can be used for various database systems, but in particular effectively applied to systems where individual users often use common data. Examples of such systems are character processing systems (including kana-kanji conversion ie. the Japanese syllabary to Chinese character conversion systems in the Japanese language and translation systems) and client information systems.

A character processing system to which the present invention is applied judges whether the registration frequency value at which a word is registered in a user dictionary is beyond a predetermined reference value. If the registration frequency value of the word is judged to be over the reference value, then the word is registered in the supplementary system dictionary. After the word is registered in the supplementary system dictionary, it is deleted from user dictionaries.

The character processing system also judges whether the use frequency value of a word registered in a user dictionary is beyond a predetermined reference value. If the use frequency value is less than the reference value, the word is deleted from the user dictionary.

Further, the character processing system judges whether the use frequency value of a connective relation record registered in a file is beyond a predetermined reference value. If the use frequency value is less than the reference value, then the connective relation record is deleted from the file.

In particular, the load of processing a word is less than a predetermined reference value, the word is automatically deleted from the user dictionary, and its connective relation record is deleted from the file.

BRIEF DESCRIPTION OF THE DRAWINGS

FIG. 3 is a diagram showing examples of user tables.

FIG. 4 is a diagram showing the state of the user tables shown in FIG. 3 after registration processing of records.

FIG. 7 is a diagram showing an exemplary record structure of the main database file shown in FIG. 5.

FIG. 8 is a diagram showing an exemplary structure of subdatabase files of the portable information terminal shown in FIG. 6.

FIG. 9 is a diagram showing an exemplary structure of the subdatabase information temporary memory shown in FIG. 5.

FIG. 10 is a diagram of the main database file after registration processing.

FIG. 15 is a diagram showing the structure of the registration count table in FIG. 14.

FIG. 16 is a diagram showing the structure of the reference value storage table in FIG. 14.

FIG. 17 is a flowchart describing the record renewal processing of the kana-kanji converter of the third embodiment.

FIG. 18 is a diagram for describing the registration processing of the kana-kanji converter of the third embodiment.

FIG. 24 is a block diagram showing the structure of the relation frequency file in FIG. 21.

FIG. 25 is a block diagram showing the structure of the relation frequency file in FIG. 21.

THE PREFERRED EMBODIMENTS FOR IMPLEMENTING THE INVENTION

The embodiments according to the present invention will be described below based on the attached drawings.

FIRST EMBODIMENT

Figure 1:
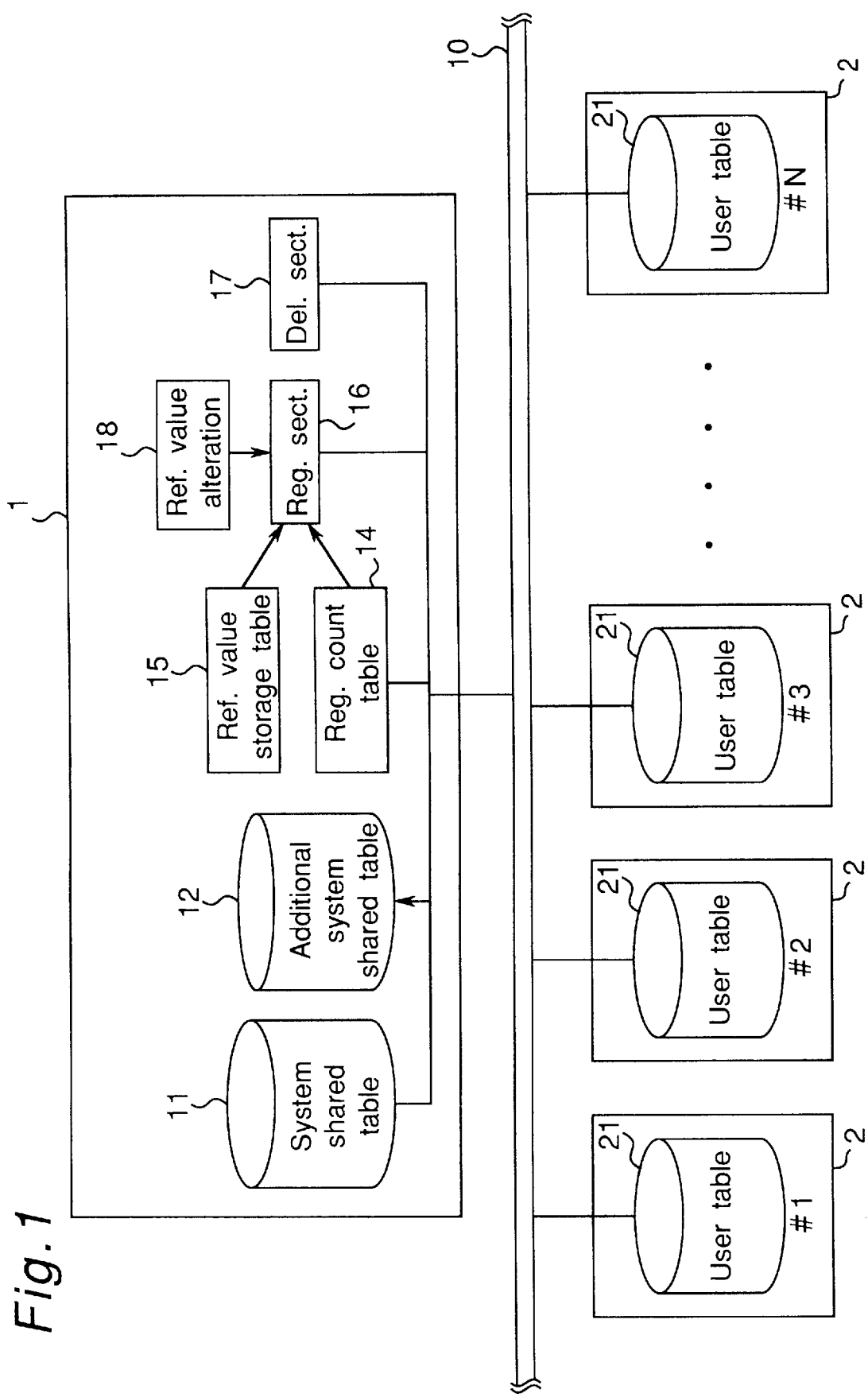
FIG. 1 is a system block diagram of the database system of a first embodiment in accordance with the present invention.

FIG. 1 is a block diagram illustrating the organization of the database system of a first embodiment in accordance with the present invention.

The database system of the present embodiment comprises a server apparatus 1 and client apparatuses 2 connected through an ethernet 10. The client apparatus consist of #1 to #N personal computers having user tables 21. The server apparatus 1 consists of a computer having large capacity memory and comprises a system shared table 11, a supplementary system shared table 12, a registration count table 14, a reference value storage table 15, a registration section 16, a record deletion section 17, and a reference value alteration section 18.

Here a server apparatus is a computer, such as a workstation, that provides services and information to computers connected to itself through a LAN. The server apparatus searches the server database based on a search condition on the database input from client apparatus.

On the other hand, a client apparatus is a computer, such as a terminal or a workstation, that receives services from other computers.

Here the system shared table 11 is a storage section shared by all client apparatuses 2 and stores records in a table structure. The present database system prohibits the users' adding or deleting records to and from the system shared table 11.

The supplementary system shared table 12 is a storage section for additionally registering records that are not registered in the system shared table 11 but preferably should be registered based on a method of the present invention. The registration count table 14 is a table for recording the number of user tables in which a record is registered, among the user tables 21 #1 to #N, that is, the registration frequency of the record. When a record is registered in one of the user tables 21, the user table number of the record is incremented by 1.

The reference value storage table 15 is a table in which reference values for selecting records from the records registered in at least one of the user tables 21 #1 to #N to register in the supplementary system shared table 12. For example, the reference values can be set depending on the classes and properties of records.

The registration section 16 judges whether the registration frequency, stored in the registration count table 14, of a record registered in a user table 21 is beyond the corresponding reference value stored in the reference value storage table 15. If the registration frequency of the record is over the reference value, then registration section 16 registers the record in the supplementary system shared table 12.

The record deletion section 17 deletes a record from all user tables 21 #1 to #N, after the record is registered in the supplementary system shared table 12.

The reference value alteration section 18 alters reference values in the reference value storage table 15, as occasion demands.

Figure 2:
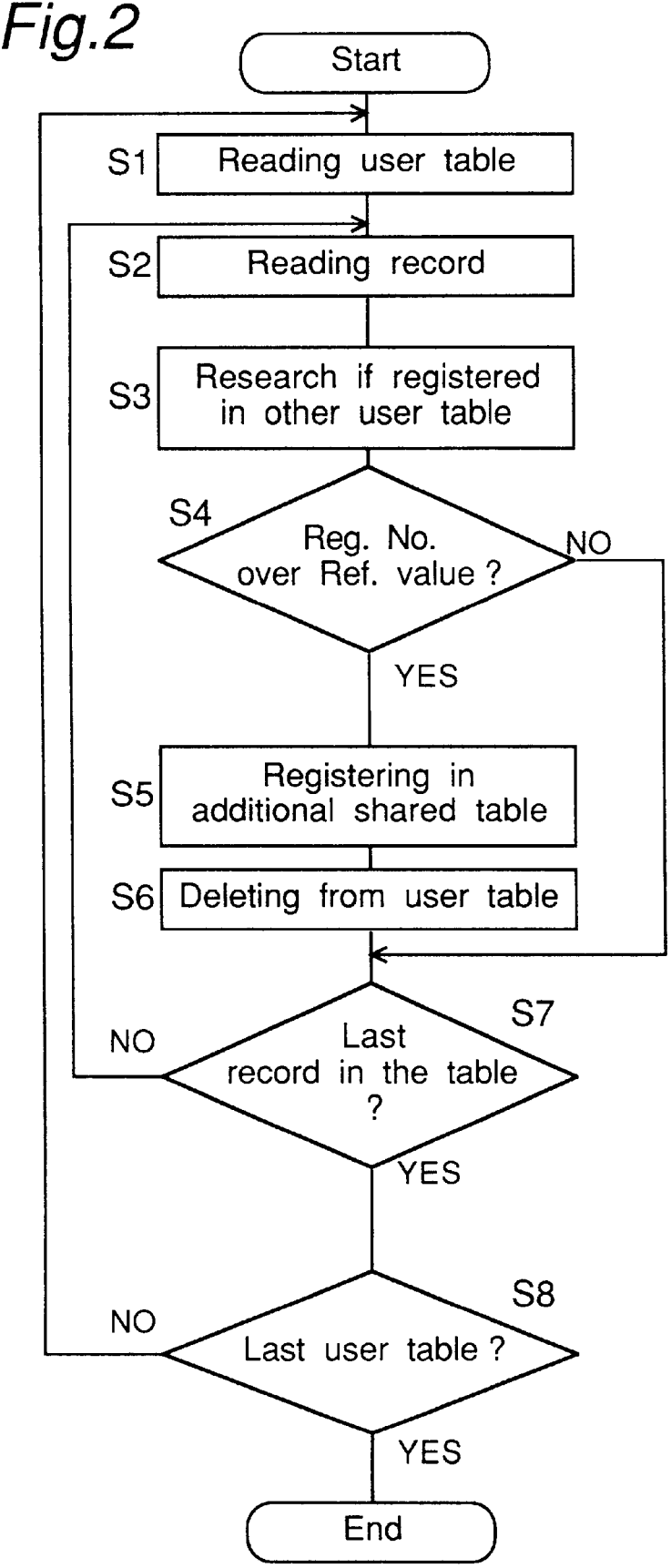
FIG. 2 is a flowchart illustrating the registration processing of a record in a shared table in the first embodiment.

Next, the operation of the database system of the present embodiment is described in conjunction with FIG. 2.

When registration processing is started, the client apparatus 2 #1 receives a read-in instruction from server apparatus 1 (S1), and then one of the records registered in the user table 21 #1 is read out (S2). Then corresponding to the read-out record, the corresponding registration frequency of the registration count table 14 is incremented by 1.

After that, the user tables 21 #2 to #N are searched with the extracted record as the key. Each time the record is found in a user table, then the registration frequency is incremented by 1 (S3).

If the processing for one record is finished in this way, then the registration section 16 judges whether the registration frequency recorded in the registration count table 14 is beyond the corresponding reference value stored in reference value storage table 15 (S4). If the registration frequency of the record is over the corresponding reference value (YES in S4), then the registration section 16 registers the record in the supplementary system shared table 12 (S5) and sends a message that the registration has been finished to the record deletion section 17.

In receiving from the registration section 16 the message that the registration has been finished, the record deletion section 17 deletes the record from the user tables 21 in which the record is registered (S6).

The above processing of record registration is repeated first for all the records registered in the user table 21 #1 (S7), then performed for the records registered in the user tables 21 from #2 to #N in the order of the users. When the processing is finished for the last record of the last user table, then the registration processing at one time is completed (S8).

FIGS. 3 and 4 show examples. As shown in FIG. 3, consider the case where each user has a telephone directory as the user table in each client apparatus 2. One record in this case consists of an individual name, company name, office phone number, and home phone number. Consider the case in which a record has been redundantly registered in two user tables as shown with netting in the figure. Further assume that a duplicate record has not been registered in the supplementary system shared table 12.

Assume that the registration condition is that more than one users have registered an identical record in each user table.

If the registration processing described with FIG. 2 is performed using this registration condition, then the record with the individual name "Nagaoka Hiroshi" registered by both users #1 and #2 and the record with the individual name "Tanaka Hajime" registered by both users #1 and #N are registered in the supplementary system shared table as shown in FIG. 4. The registered records then deleted from the user tables of the users #1, #2, and #N.

In the above embodiment, the registration count table 14, the reference value storage table 15, the reference value alteration section 18 etc. are not necessarily required, and the reference values may be set when registration processing is performed. Also, registration processing may be performed automatically with predetermined timing, or may be conducted by the operator for a batch. Further, the data structure of the database is not limited to the table structure shown above and may be any predetermined data structure.

SECOND EMBODIMENT

Figure 5:
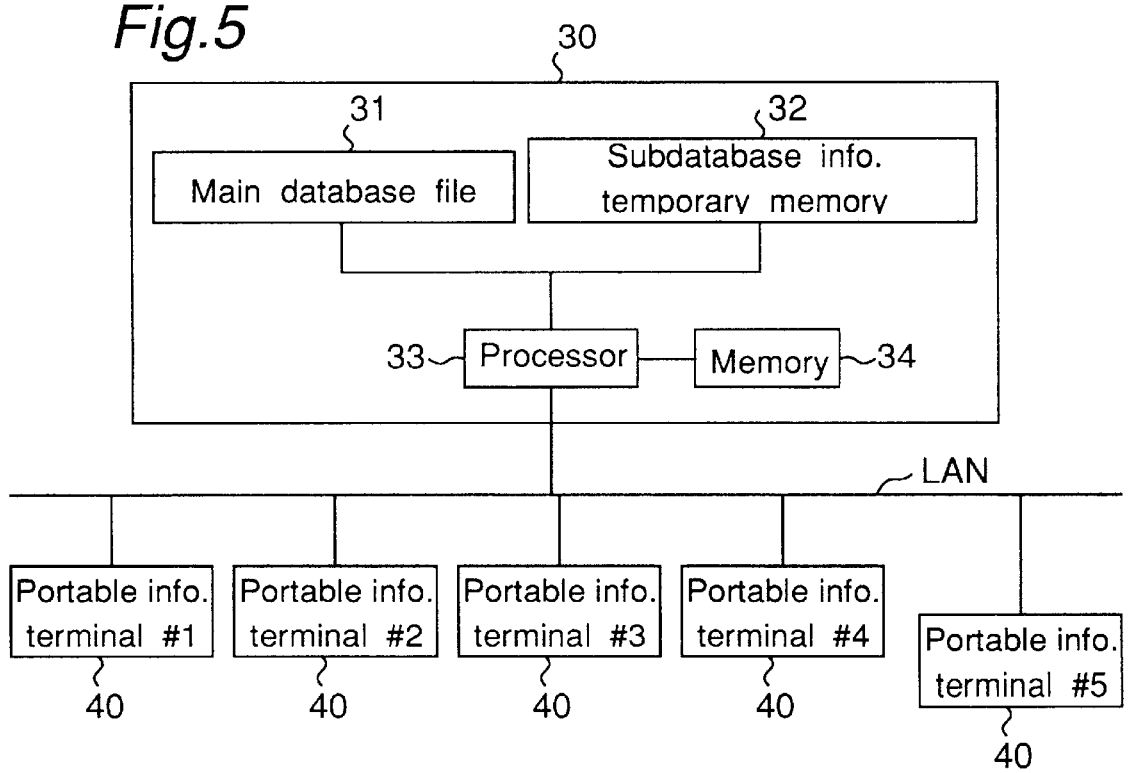
FIG. 5 is a system block diagram of the database system of the second embodiment in accordance with the present invention.

FIG. 5 illustrates a database system such that a plurality of portable information terminals 40 #1–#5 are connected to a database server 30 through a LAN (Local area network). The database server 30 has a main database file 31 shared by the portable information terminals 40 and a subdatabase information temporary memory 32 to which data is added and in which data is altered through each portable information terminal. A processor 33 executes various processings described below following various programs stored in memory (ROM) 34.

Here a portable information terminal is a portable small personal computer and comprises at least a display such as an LCD (liquid crystal display), an input device such as a key board, memory comprising RAM, ROM, and a hard disk, and a processor including a CPU that issues instructions and performs control.

Figure 6:
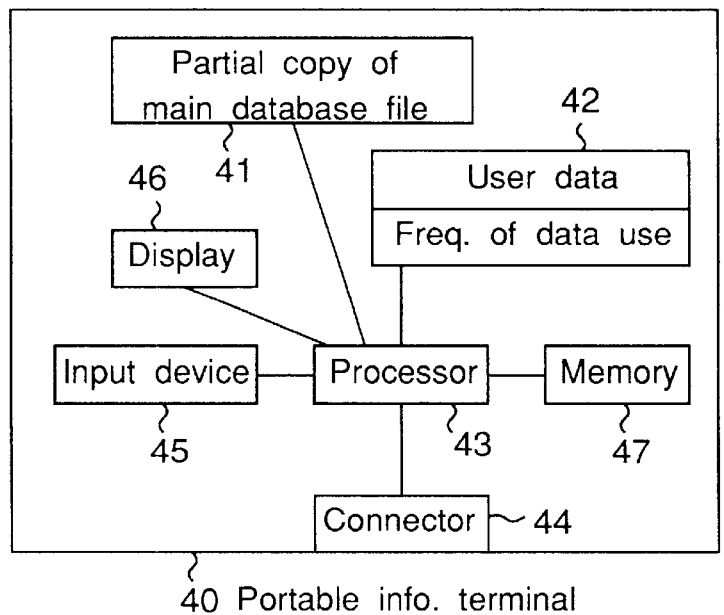
FIG. 6 is a block diagram of the portable information terminal shown in FIG. 5.

FIG. 6 shows a block diagram of each information terminal 40. Each portable information terminal 40 copies a necessary part of the main database file 31 in a copy main database file 41. Each portable information terminal 40 also stores data in a subdatabase file 42, and the data can be freely altered by the user of the portable information terminal 40.

When a search condition is input to a portable information terminal 40 through its input device 45, the search condition is temporarily stored in the memory 47 of the portable information terminal 40 through a processor 43. At the same time, the search condition is sent to the database server 30 through a connector 44. The processor 33 of the database server 30 searches the main database file 31 depending on the search condition to send the search results to the processor 43 of the portable information terminal 40. The processor 43 of the portable information terminal 40 displays the search results on its display 46.

Further, the portable information terminal 40 can perform database searching in its own copy main database file 41 or subdatabase file 42. As in the case of using the database server 30, when a search condition is input through the input device 45, the processor 43 searches the copy main database file 41 or the subdatabase file 42 to display the search results on the display 46.

FIG. 7 shows an example of the main database file 31. In this example, each record consists of an individual name, office phone number, home phone number, use frequency value (number of times), additional data. The additional data is described later.

FIG. 8 shows the structure of the subdatabase files of the portable information terminals 1–3. Each record of the subdatabase files consists of an individual name, office phone number, home phone number, and use frequency value (number of times).

FIG. 9 shows the data structure of the subdatabase information temporary memory 32 of the database server 30. Each record of the memory 32 consists of an individual name, office phone number, home phone number, user name, use frequency value (number of times) for each user, and total frequency value.

When a portable information terminal 40 is connected to the database server 30, the database server 30 successively reads out the records of the subdatabase file 42 of the portable information terminal 40 and stores in the subdatabase information temporary memory 32 the records whose use frequency values are greater than or equal to a reference value, which is, for example, 25. A user name and its use frequency value are renewed only if the use frequency value is greater than the use frequency value currently stored in the subdatabase information temporary memory 32. If the read-out use frequency value is not greater than the use frequency value currently stored in the subdatabase information temporary memory 32, then the record is not renewed.

FIG. 10 shows an example of the main database file 31 after renewal. As described above, each record of the main database file 31 consists of an individual name, company phone number, home phone number, use frequency value (number of times), additional data. However, as seen from comparing with FIG. 7, the record of "Okamoto Taro" is added, and "1" is recorded in its additional data field. Thus, the additional data field used for judging whether this record originally existed in the main database file 31 or was newly added.

The condition for additional registration of a record is, for example, that the use frequency value of the record is more than 25 in more than two portable information terminals. If we refer to the subdatabase information temporary memory 32 of FIG. 9, we see that a record satisfying this registration condition is the record of "Okamoto Taro." Therefore, as shown in FIG. 10, this record of "Okamoto Taro" is additionally registered in the main database file 31 by registration processing (renewal processing), and "1" is entered in the additional data field. Here the use frequency value is used for the criterion (condition) for registering in the main database file 31, but the degree of importance of the record (data) can be used in place of or together with the use frequency value for the criterion. The degree of importance of a record is determined by the user of the portable information terminal 40 when the user stores the record in the subdatabase information temporary memory 32 based on his or her judgment.

Figure 11:
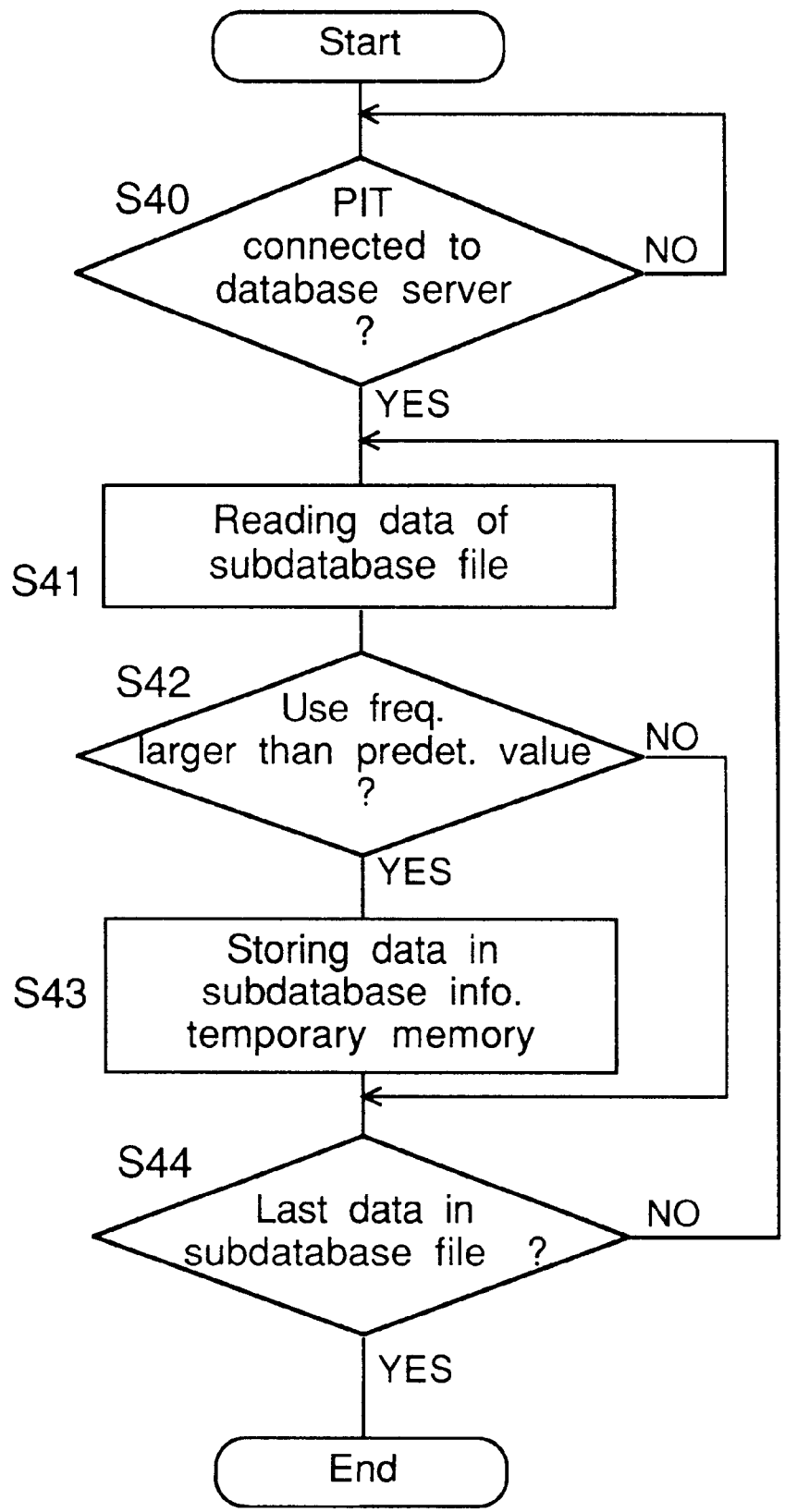
FIG. 11 is a flowchart showing the processing of record registration in the subdatabase information temporary memory.

FIG. 11 shows a flowchart for the processing of reading records from the subdatabase file 42 of a portable information terminal 40 and adding and altering necessary records in the subdatabase information temporary memory 32.

The database server 30 judges whether the portable information terminal 40 is connected to itself. If it is, (YES in S40), then the database server 30 reads a record out of the subdatabase file 42 of the portable information terminal 40 (S41), and judges whether the use frequency value of the record is more than or equal to a predetermined value (e.g., reference value 25) (S42). If it is, then the database server 30 stores the record in its subdatabase information temporary memory 32 (S43). This renewal processing is repeated until the last record of the subdatabase file 42 of the portable information terminal 40 (S44) to terminate the routine when the last record was processed.

Figure 12:
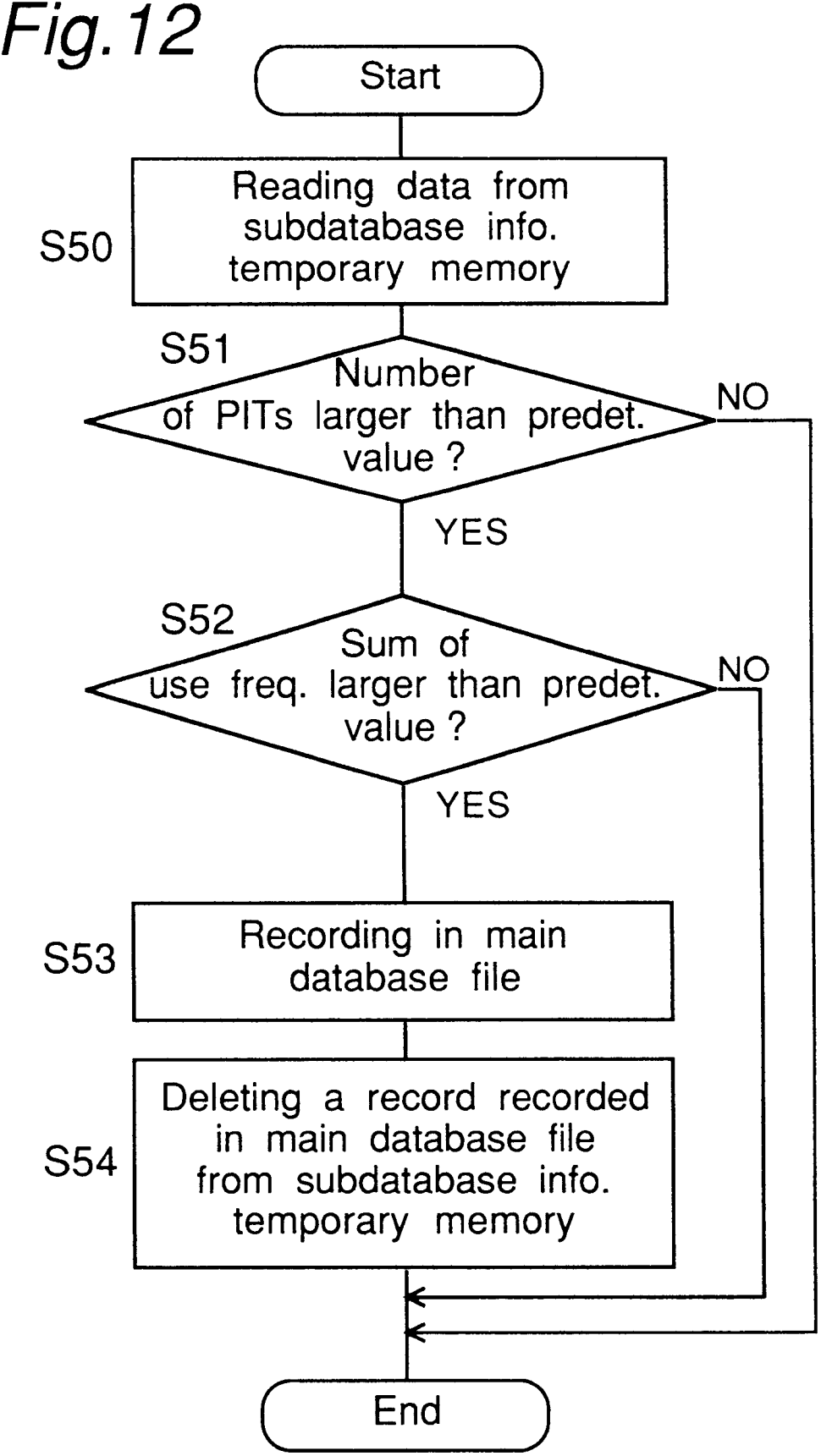
FIG. 12 is a flowchart showing the processing of registration from the subdatabase information temporary memory into the main database file.

FIG. 12 shows a flowchart for writing records in the main database file 31.

When this routine is started, the database server 30 reads out a record stored in the subdatabase information temporary memory 32 of the portable information terminal 40 (S50), and judges whether the record is recorded in portable information terminals 40 of more than or equal to a predetermined number (e.g., 3) or not (S51). If it is, then database server judges whether the sum of use frequency values is greater than or equal to a predetermined number (e.g., 80) (S52). If it is, then the database server 30 additionally registers the record in the main database file 31 (S53), since the condition for additional registration is satisfied. Then the database server 30 deletes the record from the subdatabase information temporary memory 32, since it is not necessary to keep the record in the subdatabase information temporary memory 32.

This processing is preferably performed at constant intervals, for example, once every day, but may be performed at irregular intervals.

Figure 13:
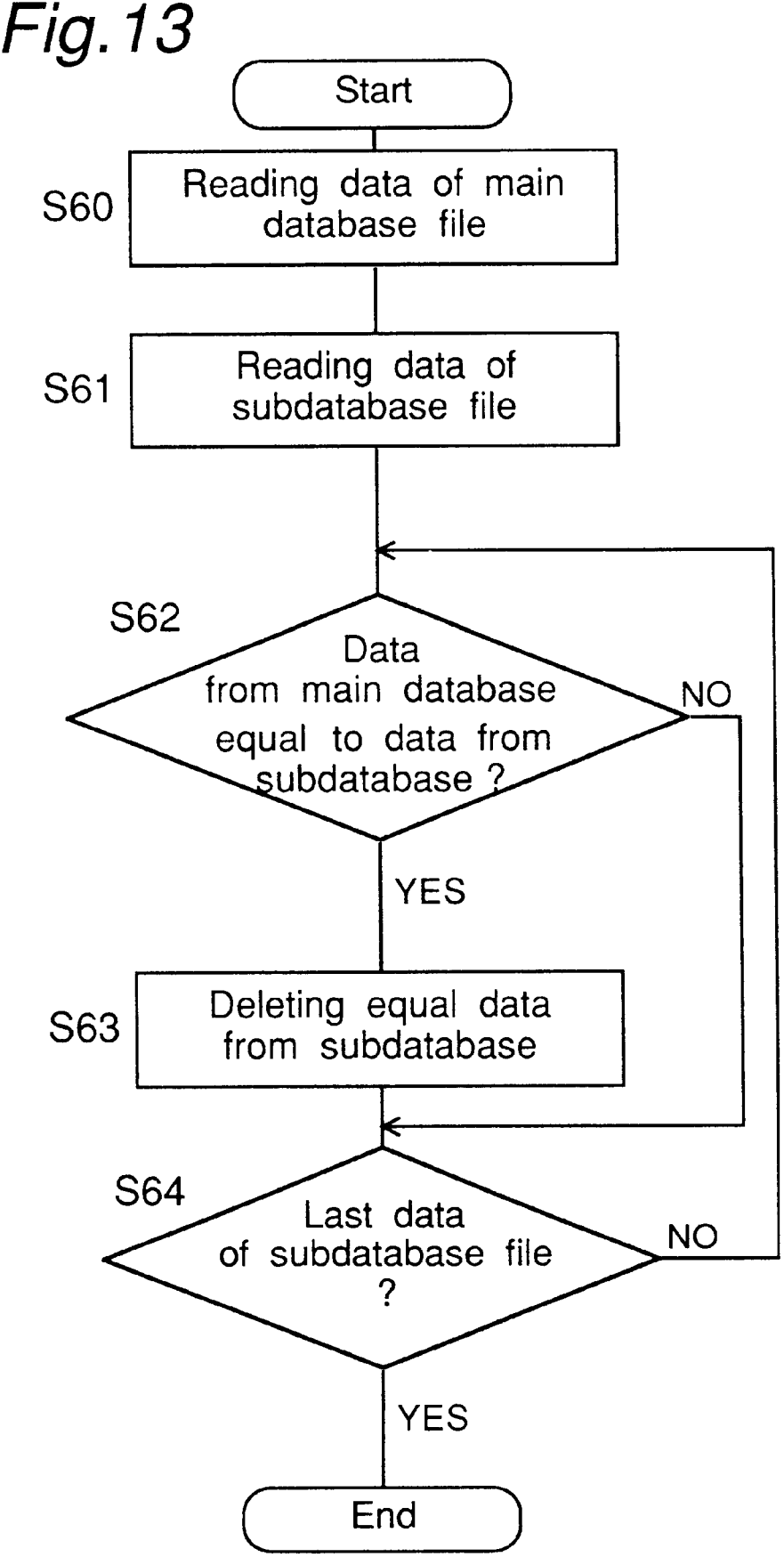
FIG. 13 is a flowchart of the processing of record deletion after registration processing.

FIG. 13 shows a flowchart for editing records in the subdatabase file of a portable information terminal. It is meaningless to keep records that have been added to the main database file 31 in portable information terminals 40, so that these records are deleted. When this processing is started, the database server 30 reads a record out of the main database file 31 (S60), and then reads out a record of the subdatabase file 42 of the portable information terminal 40 to judge whether the record of subdatabase file is identical to the record of the main database file 31 (S62). If it is, then the database server 30 deletes the record of the subdatabase file 42 (S63). This deletion processing is performed for all the records of the subdatabase file 42 to terminate the routine when the processing of the last record is finished (S64). Effective use of the memory for the subdatabase file 42 is achieved in this way. The deletion processing is performed after a constant time period has passed and when the portable information terminal 40 is connected to the database server 30. However, the user of a portable information terminal may conduct the processing at any time.

THIRD EMBODIMENT

Figure 14:
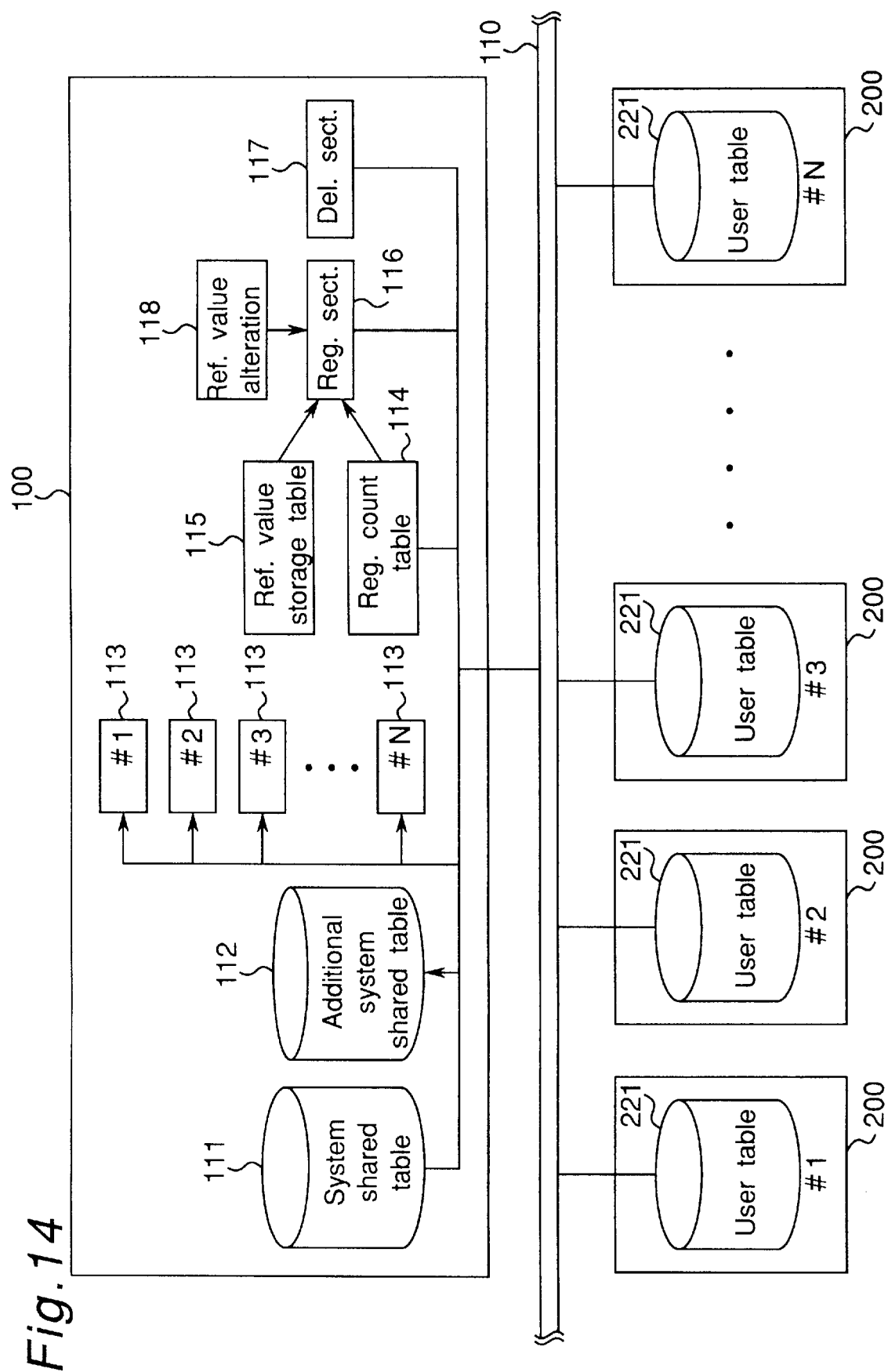
FIG. 14 is a block diagram showing the construction of a kana-kanji converter that is a third embodiment of the present invention.

FIG. 14 is a block diagram illustrating the construction of a kana-kanji converter that is an application to a Japanese language word processor of a database system in accordance with the present invention.

The kana-kanji converter of the present embodiment consists of a server apparatus 100 as a server and client apparatus 200 #1 to #n connected through an ethernet 110, each client apparatus having its own user dictionary 221. Server apparatus 100 is equipped with a system dictionary 111, a supplementary system dictionary 112, a user frequency information file 113, a registration count table 114, a reference values storage table 115, a registration section 116, a word deletion section 117, and a reference value alteration section 118.

Here the system dictionary 111 is a shared basic word dictionary for performing kana-kanji conversion. In the dictionary, several converted words are assigned to each reading, and each of these assigned converted words is provided with its part of speech and use priority value. This system dictionary is created so as not to be altered by addition or deletion.

The supplementary system dictionary 112 is a word dictionary in which converted words necessary for kana-kanji conversion are additionally collected, and converted words corresponding to readings are registered. However, unlike the system dictionary 111, supplementary system dictionary has no entry for parts of speech.

In the user frequency information file 113, there is stored a priority value that is an index indicating the priority of each converted word in reading it out, corresponding to a reading, from the system dictionary 111 and the supplementary system dictionary 112.

The registration count table 114 is a table that records the registration frequency of a record registered in the user dictionaries 221 #1 to #n. As shown in FIG. 15, the registration count table 114 is divided according to parts of speech, such as proper nouns, common nouns, verbs etc. Each division comprises a reading storage area 141 that stores a pronunciation represented with Japanese alphabets (herein after referred to as Japanese pronunciation), a converted words storage area 142 that sores a converted word corresponding to the Japanese pronunciation of the Japanese pronunciation storage area 141, a user dictionaries number area 143 that stores the number of user dictionaries in which the Japanese pronunciation is stored, and a priority values sum storage area 144 that sores the sum of priority values of the Japanese pronunciation.

Here a priority value is an index indicating the priority of each Japanese pronunciation in reading out a converted word corresponding to the Japanese pronunciation from a user dictionary 221. The priority value is assigned by each user when registering a word in its user dictionary 221. The sum of the priority values is the sum of the priority values of a word registered in user dictionaries 221. Therefore, the greater the sum of priority values of the Japanese pronunciation, the preferably the converted words of the Japanese pronunciation are read out by the whole user dictionaries 221. Therefore, the sum of priority values becomes a barometer for selecting words from the user dictionaries 221 #1 to #n to register in the supplementary system dictionary 112.

For example, FIG. 15 shows that the Japanese pronunciation "kubo" stored in the Japanese pronunciation storage area 141 is converted into "窪," and the number of user dictionaries in which this Japanese pronunciation is registered is 10, and the sum of the priority values is 15.

The reference values storage table 115 is a table that stores reference values for selecting words from words registered in user dictionaries 221 #1 to #n to register in the supplementary system dictionary 112. As shown in FIG. 16, the reference values storage table 115 comprises a part-of-speech area 151 that stores a part-of-speech name, a first reference values storage area that stores a first reference value for each part-of-speech name stored in the part-of-speech area 151, and a second reference values storage area that stores a second reference value.

Here a first reference value is the number of user dictionaries 221 in which a converted word corresponding to the Japanese pronunciation is registered. A second reference value is the sum of the priority values.

For example, the figure shows that, in the case of proper nouns, the fist reference value is 3 and the second reference value is 10.

The registration section 116 judges whether the registration frequency of a word stored in the registration count table 114 is beyond the corresponding reference value stored in the reference values storage table 115. If it is, then the word is registered in the supplementary system dictionary 112.

Here the registration frequency of a word is the number of user dictionaries in which the word is registered or a combination of the sum of the number of user dictionaries and the priority value of the word.

The word deletion section 117 deletes a word from all user dictionaries 221 #1 to #n, after the word is registered in the supplementary system dictionary 112.

The reference value alteration section 118 alters first reference values and second reference values in the reference values storage table 115.

Next, the operation of the kana-kanji converter of the present embodiment is described in conjunction with FIG. 17.

When, the client apparatus 200 #1 receives a user-dictionary-read instruction from the server apparatus 100, a user dictionary 221 #1 is read (S100). Then a record registered in the user dictionary 221 #1 is read out (S110). Then the Japanese pronunciation, converted words, and the priority value of the read-out record are respectively stored in the Japanese pronunciation storage area 141, the converted words storage area 142, and the priority values sum storage area 144 of the registration count table 114, and the user dictionaries number storage area 143 is incremented by 1.

After that, by searching user dictionaries 221 #2 to #n with the read-out word as a key, whether the word is registered in these dictionaries is judged (S130).

Whenever the word is registered in one of user dictionaries 221 #2 to #n (YES in S130), then user dictionary numbers storage area 143 is incremented by 1, and the priority value registered in the user dictionary is added to the priority values sum storage area 144 (S140).

On the other hand, if the word is not registered in user dictionaries 221 #2 to #n (NO in S130), then the next word is read out for processing similar to the above one. After the above processing is performed in this way for all words registered in user dictionary #1, then the client apparatus 200 #2 to #n successively receive a user-dictionary-read instruction from the server apparatus 100 to repeat processing similar to the above for the user dictionaries 221 #2 to #n. However, a design is made so that the words registered in the user dictionaries 221 #1 to #n are not redundantly processed.

When the above processing of the last word read out from user dictionary 221 #n is finished (S160), the registration section 116 selects, from Japanese pronunciation stored in the registration count table 114, the Japanese pronunciation such that the numbers of user dictionaries of the Japanese pronunciations stored in the dictionaries number storage area 143 are greater than the corresponding first reference values (number of user dictionaries) stored in the reference values storage area 152 of the reference values storage table 115 (S170). Then the selected Japanese pronunciations and converted words corresponding to them are registered in the supplementary system dictionary 112 (S180), and a message indicating the completion of registration is sent to the word deletion section 117.

When receiving the message from the registration section 116 about the completion of registration, the word deletion section 117 deletes the Japanese pronunciations from the user dictionaries 221 in which the Japanese pronunciations are registered.

In the above processing S170, the registration section 116 may alternatively select the Japanese pronunciations such that the priority values sums stored in the priority values sum storage area 144 are greater than the corresponding second reference values.

Further, in the processing from S100 to S160, all the user dictionaries 221 #1 to #n may be simultaneously activated when a user-dictionary-read instruction is received. The time for the selection operation can be shortened by this means.

The operation of the above processing is described in more detail in conjunction with FIG. 18.

In the example shown in FIG. 18, the user dictionary 221 #i has a record such that the Japanese pronunciation is "hiroshi," the converted word is "比呂志," and the priority value is 200. User dictionary 221 #j has a record such that the Japanese pronunciation is "hiroshi," the converted word is "比呂志," the priority value is 20.

When client apparatus 200 #i takes out a converted word of the Japanese pronunciation "hiroshi," "宏," which has a greater priority value in the user frequency information file 113 #i than "博," is preferably selected to "宏." For client apparatus 200 #j, "博" is preferably selected to "宏."

By the above processing, the converted word "比呂志" is registered in supplementary system dictionary 112, and the record in which the Japanese pronunciation is "hiroshi" and the converted word "比呂志" is deleted from user dictionaries 221 #1 and 221 #j.

The priority value 200 of "比呂志" is stored in the user frequency file 113 #i. Therefore, after "比呂志" is registered in the supplementary system dictionary 112, this "比呂志" is most preferably selected.

In the user frequency file 113 #j, the priority value 20 of "比呂志" is less than the priority values of "宏" and "博," so that "比呂志" is selected latest among the three converted words.

In the above embodiment, a Japanese language word processor was described. However, the present invention is not limited to Japanese language word processors, and can be applied to other word processors and mechanical translators.

FOURTH EMBODIMENT

Figure 19:
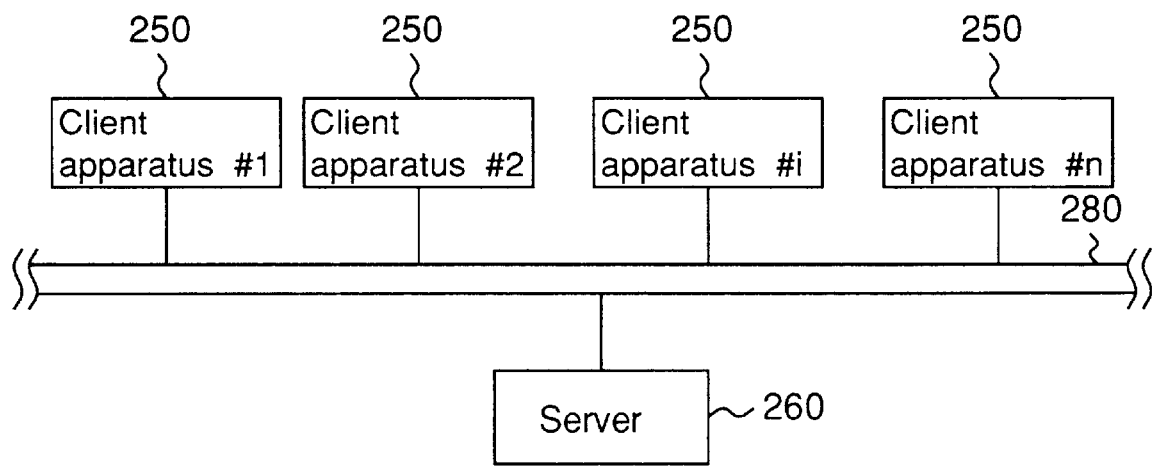
FIG. 19 is a block diagram showing the construction of kana-kanji converter of a fourth embodiment in accordance with the present invention.

FIG. 19 shows a block diagram of a second embodiment of kana-kanji converters in accordance with the present invention.

The second embodiment of kana-kanji converters consists of client apparatus 250 #1 to #n and a server apparatus 260 connected through an ethernet 280.

Figure 20:
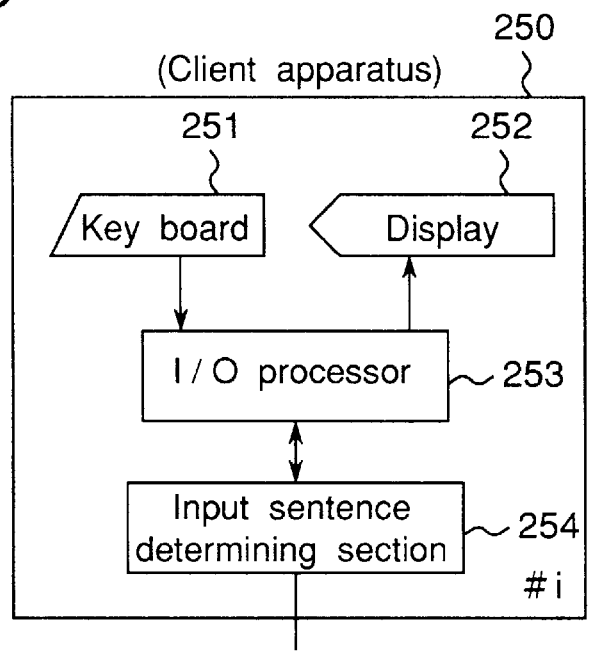
FIG. 20 is a block diagram showing the construction of a client apparatus in FIG. 19.

Each of the client apparatus 250 #1 to #n comprises, as shown in FIG. 20, a key board 251 that inputs Roman letters, kana letters, etc., a display 252 that shows input letters, conversion candidates, conversion results, etc., an input output processor 253, and an input sentence determining processor 254.

Here the input output processor 253 stores in a buffer (not illustrated) a letter sequence input from the keyboard 251 and its edited sequence to represent on the display 252. The input output processor 253 also stores in a buffer (not illustrated) converted results corresponding to the input letter sequence to represent on the display 252.

When receiving an input letter sequence from the input output processor 253, the input sentence determining processor 254 obtains all Japanese pronunciations contained in this input letter sequence from a system dictionary 265, a supplementary system dictionary 266 and a user dictionary 267 by means of a dictionary search section 261, which is described later. The input sentence determining processor 254 then divides the input letter sequence into elementary phrases (bunsetstu in Japanese) based on the Japanese pronunciation it received from dictionary search section 261. Next, the input sentence determining processor 254 determines words for each elementary phrase of the input letter sequence that has been divided into elementary phrases to output on the display 252.

Figure 21:
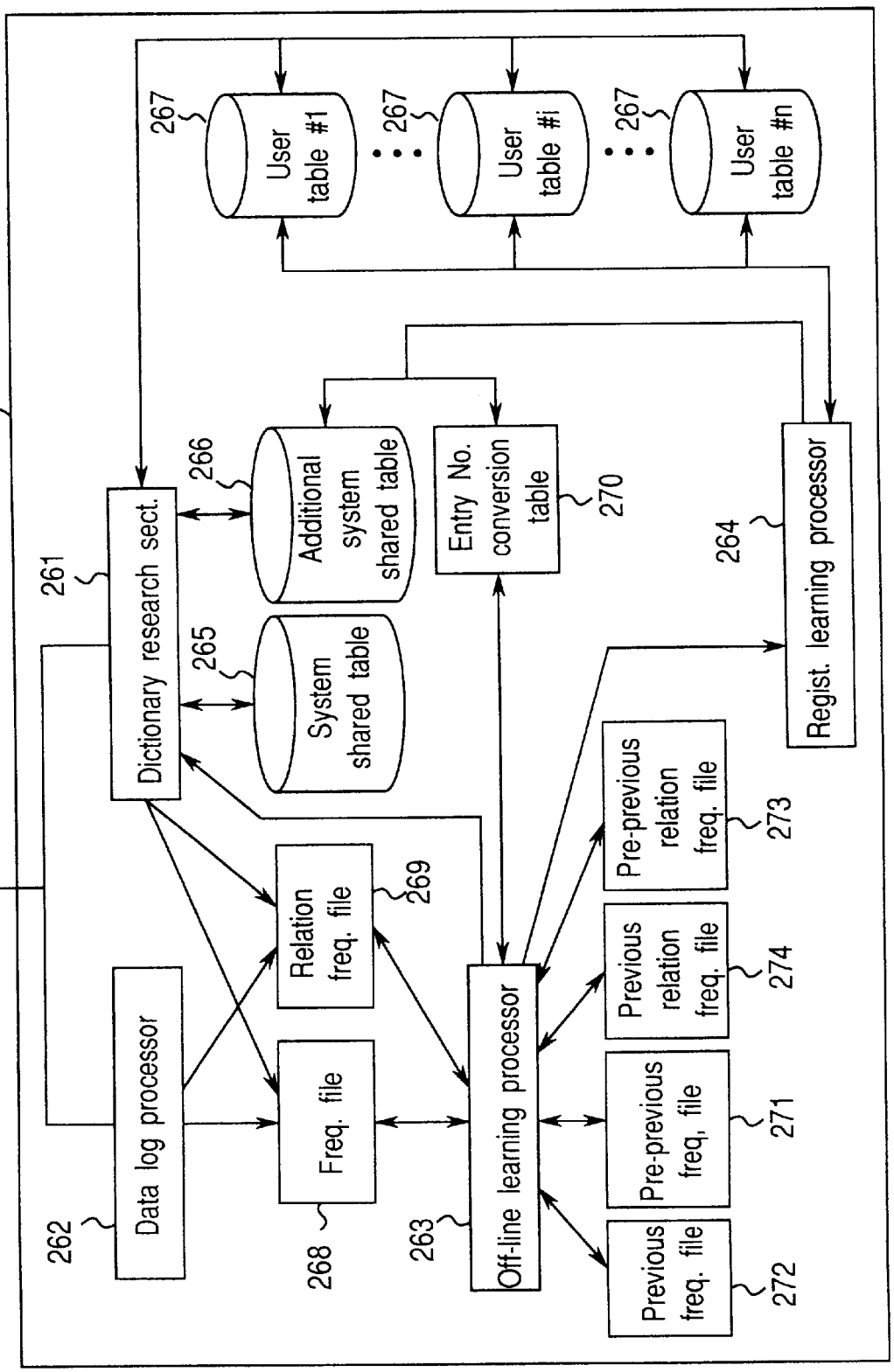
FIG. 21 is a block diagram showing the construction of the server apparatus in FIG. 19.

On the other hand, as shown in FIG. 21, the server apparatus 260 comprises a dictionary search section 261, a data log processor 262, an offline learning processor 263, a registered word learning processor 264, a system dictionary 265, a supplementary system dictionary 266, user dictionaries 267 #1 to #n, a frequency file 268 that stores the use frequency value of a word corresponding to the Japanese pronunciation, a relation frequency file 269 that stores the relation frequency value of a connective relation between words, an entry number conversion table 270, a pre-previous frequency file 271, a previous frequency file 272, a pre-previous relation frequency file 273, and a previous relation frequency file 274.

The dictionary search section 261 searches the system dictionary 265, the supplementary system dictionary 266, and the user dictionaries 267 to retrieve conversion candidates corresponding to the Japanese pronunciation.

When receiving from the client apparatus 250 a message that a word has been determined from conversion candidates of the Japanese pronunciation in the input sentence determining processor 254, the data log processor 262 renews the frequency file 268, which is described later, by incrementing the use frequency value of the word by 1. Further, when receiving from the client apparatus 250 a message that a connective relation record having a connective relation between words has been used, the data log processor 262 renews the relation frequency file 269 by incrementing the relation frequency value of the record by 1.

The offline learning processor 263 issues a lock instruction to dictionary search section 261 to prohibit the renewal of the use frequency value of a word, the registration or deletion of a word, and the Japanese pronunciation of a dictionary, and the like. Further, the offline learning processor 263 examines the use frequency values of words and relation frequency values registered in the user dictionaries 267 to delete words of extremely low use frequency (frequency value 0) from the user dictionaries 267. The offline learning processor 263 also reconstructs the user dictionaries 267 by garbage collection of reusable areas created by deletion.

Further, the offline learning processor 263 examines the relation frequency values of connective relation records in the relation frequency file 269, as described later, to reduce the relation frequency value of a connective relation record whose relation frequency value has not changed during a predetermined period, and to delete a connective relation record whose relation frequency is extremely low (frequency value 0).

The registration learning processor 264 picks up from the words registered in the user dictionaries 267 those words whose use frequency values are beyond a predetermined reference value to register in the supplementary system dictionary 266.

In doing so, the registration learning processor 264 stores, in the entry number conversion table 270, which is described later, the entry number of each registered word in the dictionary from which the word is moved.

The system dictionary 265 is a word dictionary for performing kana-kanji conversion. In the dictionary, several converted words are assigned to each Japanese pronunciation, and each of these assigned converted words is provided with its part of speech and use priority value.

Further, the system dictionary 265 is created so as not to be altered by addition or deletion.

The system dictionary 265 is divided by fields such as law, economics, science, engineering, etc., and each of these divisions can be regarded as an independent dictionary.

By doing so, each user can set a dictionary ID for each field division to specify one or more IDs to let the kana-kanji converter to search only the fields specified by the dictionary IDs. Therefore, the kana-kanji converter does not need to search the whole system dictionary 265 and thereby shortens conversion time.

The supplementary system dictionary 266 is, like the system dictionary 265, a word dictionary for performing kana-kanji conversion. In the supplementary system dictionary, several converted words (kanji and the like) are assigned to each Japanese pronunciation, and each of these assigned converted words is provided with its part of speech and its use priority value. However, the supplementary system dictionary 266 is not divided into fields such as law and economics, and all use priority values are set at 0.

The user dictionaries 267 are dictionaries for users to use new words depending on their own use environments and to register words on their parts. The construction of user dictionaries is similar to the system dictionary 265. That is, several converted words (kanji and the like) are assigned to each Japanese pronunciation, and each of these assigned converted words is provided with its part of speech and its use priority value.

Figure 22:
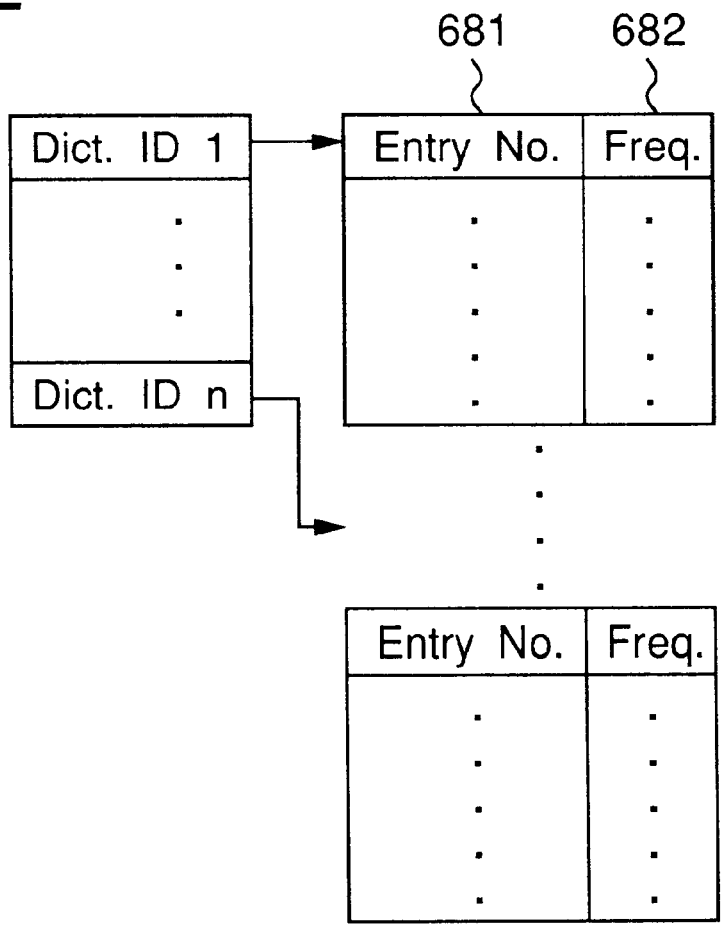
FIG. 22 is a block diagram showing the structure of the frequency file in FIG. 21.

The frequency file 266 consists of an entry number area 681 and a frequency area 682, as shown in FIG. 22. Here the entry number area 681 shows the entry number stored in the dictionary of a word (kanji and the like) read out during a predetermined period. The frequency area 682 shows the number of times at which a word (kanji and the like) stored in a dictionary has been used during a predetermined period.

Figure 23:
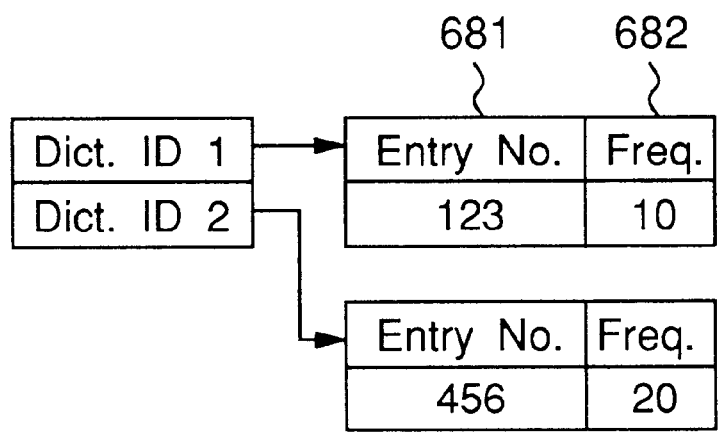
FIG. 23 is a block diagram showing the structure of the frequency file in FIG. 21.

For example, as shown in FIG. 23, the memory state of the frequency file 268 for the case of the Japanese pronunciation "kokkai" is described in the following. As shown in the figure, words (kanji) corresponding to the Japanese pronunciation "kokkai" are "国会" and "黒海." The kanji "国会" is the 123rd entry of the dictionary ID 1 of politics and has been read out 10 times during a predetermined period. On the other hand, "黒海" is the 456th entry of the dictionary ID 2 of geography and has been read out 20 times during the predetermined period.

The relation frequency file 269, as shown in FIG. 24, consists of an entry number area 691 and a connective relation data area 692 composed of a post-connective dictionary ID area 692a, an entry number area 692b, and a relation frequency area 692c. Here entry number area 691 shows the storage place of a preceding word in a connective relation record such as "人 (person)" in "人が行く (A person goes)."

The connective relation data area 692 stores the connective relation of a succeeding word to a preceding word in a connective relation record. The post-connective dictionary ID area 692a stores the dictionary ID in which a succeeding word is stored. The entry number area 692b stores the entry number of a succeeding word in the dictionary in which a succeeding word is stored. The relation frequency area 692c stores the number of times at which a converted sentence such as the above one has been read out during the predetermined period.

As examples, the three cases "人が立つ, (A person stands)" "人が行く," and "人が発つ (A person starts)" as shown in FIG. 25 are described in the following. In the case of "人が立つ," the figure shows that the word "人" is the 20th entry of dictionary ID 1–3, which is a general-purpose dictionary. The figure shows that the word "立つ (stand)" is the 30th entry of dictionary ID 4, which is a general-purpose dictionary, and that the relation frequency value of "人が立つ" is 40.

In the case of "人が行く," the figure shows that the word "人が行" is the 20th entry of dictionary ID 1–3, which is a general-purpose dictionary. The figure shows that the word "行く" is the 50th entry of dictionary ID 4, which is a general-purpose dictionary, and that the relation frequency value of "人が行く" is 60.

In the case of "人が発つ," the figure shows that the word "人" is the 20th entry of dictionary ID 1–3, which is a general-purpose dictionary. The figure shows that the word "発つ" is the 60th entry of dictionary ID 4, which is a general-purpose dictionary, and that the relation frequency value of "人が発つ" is 1.

When the registration learning processor 264 registers a word stored in a user dictionary 267 in the supplementary system dictionary 266, it stores in the entry number conversion table 270 the correspondence of the entry number of the word in the supplementary system dictionary 266 to the entry numbers of the user dictionaries 267 in which the word is registered.

Figure 26:
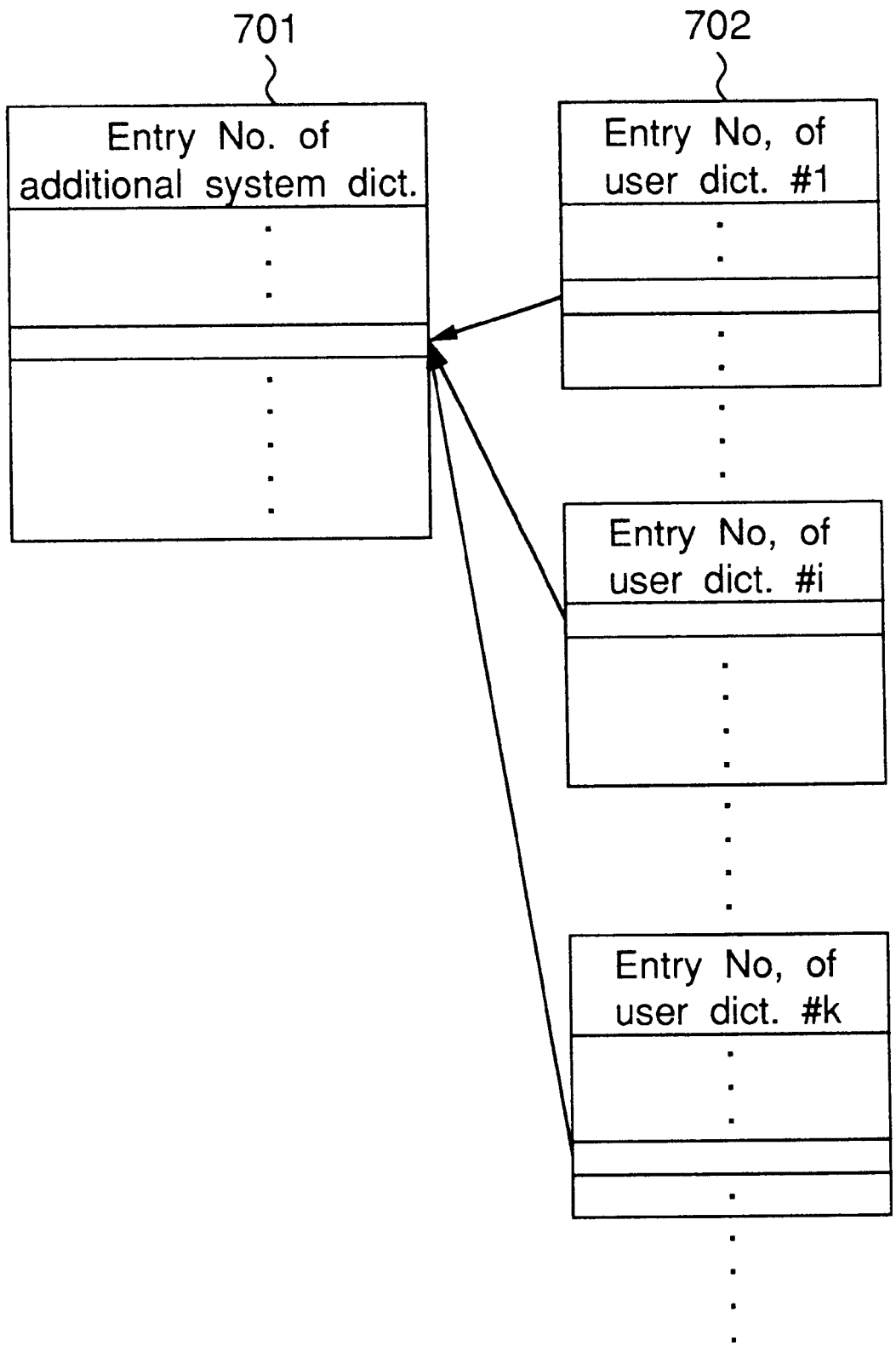
FIG. 26 is a block diagram showing the entry number conversion table in FIG. 21.

As shown in FIG. 26, entry number conversion table 270 has a supplementary system dictionary entry storage area 701 that stores the storage location of a word in the supplementary system dictionary and user dictionary entry number areas 702, each of which corresponds to a user dictionary 267 and stores the storage location of a word in the user dictionary from which the word is taken into the supplementary system dictionary.

The pre-previous frequency file 271 is structured the same as the frequency file 268 and renewed by copying the previous frequency file 272 before the offline learning processor 263 deletes words from the user dictionaries 267. The previous frequency file 272 is structured the same as the frequency file 268 and the pre-previous frequency file 271 and renewed by copying the frequency file 268 after the pre-previous frequency file 271 is renewed.

The pre-previous relation frequency file 273 is structured the same as the relation frequency file 269 and renewed by copying the previous relation frequency file 274 after the previous frequency file 272 is renewed. The previous relation frequency file 274 is structured the same as the relation frequency file 269 and the pre-previous relation frequency file 273 and renewed by copying the relation frequency file 269 after the pre-previous relation frequency file 273 is renewed.

Next, the operation of the kana-kanji converter of the present embodiment is described. For clarifying the description, the operation is divided into (1) performing kana-kanji conversion and (2) performing offline learning for deleting words from user dictionaries.

(1) CASE OF SUCCESSIVELY PERFORMING KANA-KANJI CONVERSION.

Figure 27:
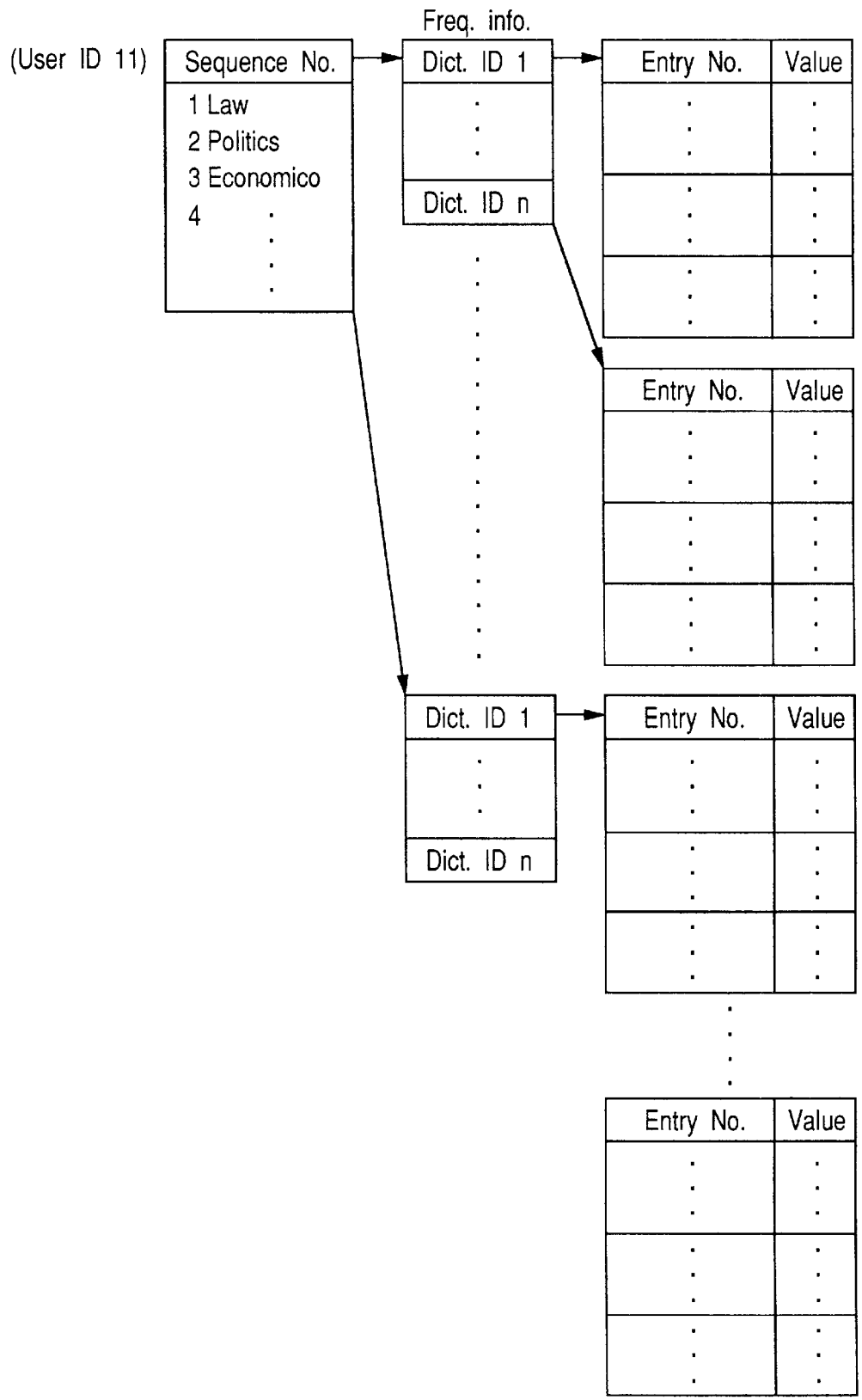
FIG. 27 is a block diagram showing the processing for accessing the frequency file in FIG. 21.

The method of kana-kanji conversion is well-known, so that the following description is brief. After inputting a user ID through the key board 251, a user selects one or more from the fields presented on the display 252, such as general field 1, general field 2, law field, political field, economics field, science field, etc. Then the dictionary IDs of the selected fields and the dictionary ID of the dictionary 267 that only the user can use are output into the input sentence determining processor 254 through the input output processor 253 (See FIG. 27).

Then, the input sentence determining processor 254 instructs the dictionary search section 261 in the server apparatus 260 to search the dictionaries of the above dictionary iDs and the supplementary system dictionary, which has also its own dictionary IDs.

After that, when the user inputs a letter sequence from the key board 251, the input output processor 253 sends the input letter sequence that it has received from the key board 251 to the display 252 to be displayed thereby. Also the input output processor 253 outputs the input letter sequence into the input sentence determining processor 254.

When receiving the input letter sequence, the input sentence determining processor 254 performs syntactic analysis of the input letter sequence.

Specifically, the input sentence determining processor 254 judges whether a sentence corresponding the input letter sequence exists in the relation frequency file 269 or not through the dictionary search section 261. If a plurality of sentences exist in the file, then a syntax (a sentence) having the greatest relation frequency value is determined and output as an input sentence corresponding to the input letter sequence.

On the other hand, if no sentence corresponding to the input letter sequence exists in the relation frequency file 269, then the input sentence determining processor 254 divides the input letter sequence into elementary phrases and determines words for each elementary phrase to determine an input sentence corresponding to the input letter sequence.

The above processing is described in more detail. When receiving an input letter sequence from the input output processor 253, the input sentence determining processor 254 instructs the dictionary search section 261 to read out all possible Japanese pronunciations obtained from the input letter sequence from the system dictionary 265, the supplementary system dictionary 266, and a user dictionary 267.

Then dictionary search section 261 searches only the dictionaries having the designated dictionary IDs of the system dictionary 265, the supplementary dictionary 266, and the user dictionaries to output a plurality of candidate words (homonyms) corresponding to each Japanese pronunciation into the input sentence determining processor 254. The input sentence determining processor 254 divides the input letter sequence into elementary phrases based on the Japanese pronunciations it received from the dictionary search section 261. Then input sentence determining processor 254 performs conversion to words for each elementary phrase. This conversion process from the Japanese pronunciation to words performed for each elementary phrase is described in the following.

When receiving a plurality of words that are candidate words for the Japanese pronunciation of each elementary phrase from the dictionary search section 261, the input sentence determining processor 254 takes the frequency value of each candidate word from the frequency file 268 and adds it to the use priority value of the word. Then the input sentence determining processor 254 determines a word having the maximum value of this sum as the word corresponding to the Japanese pronunciation of the elementary phrase.

When an input sentence is determined in this way, the data log processor 262 increments by 1 the relation frequency value of a connective relation record involved in the determination, if the input sentence has been determined using the relation frequency file 269. The data log processor 262 increments by 1 the frequency values of the determined words, if the input sentence has been determined by dividing the input letter sequence into elementary phrases to determine each word in each elementary phrase.

In this way, relation frequency values in the relation frequency file 269 and frequency values in the frequency file 268 are renewed, so that input sentences and words that are often used have higher rates of conversion times.

(2) CASE OF PERFORMING OFFLINE LEARNING.

Figure 28:
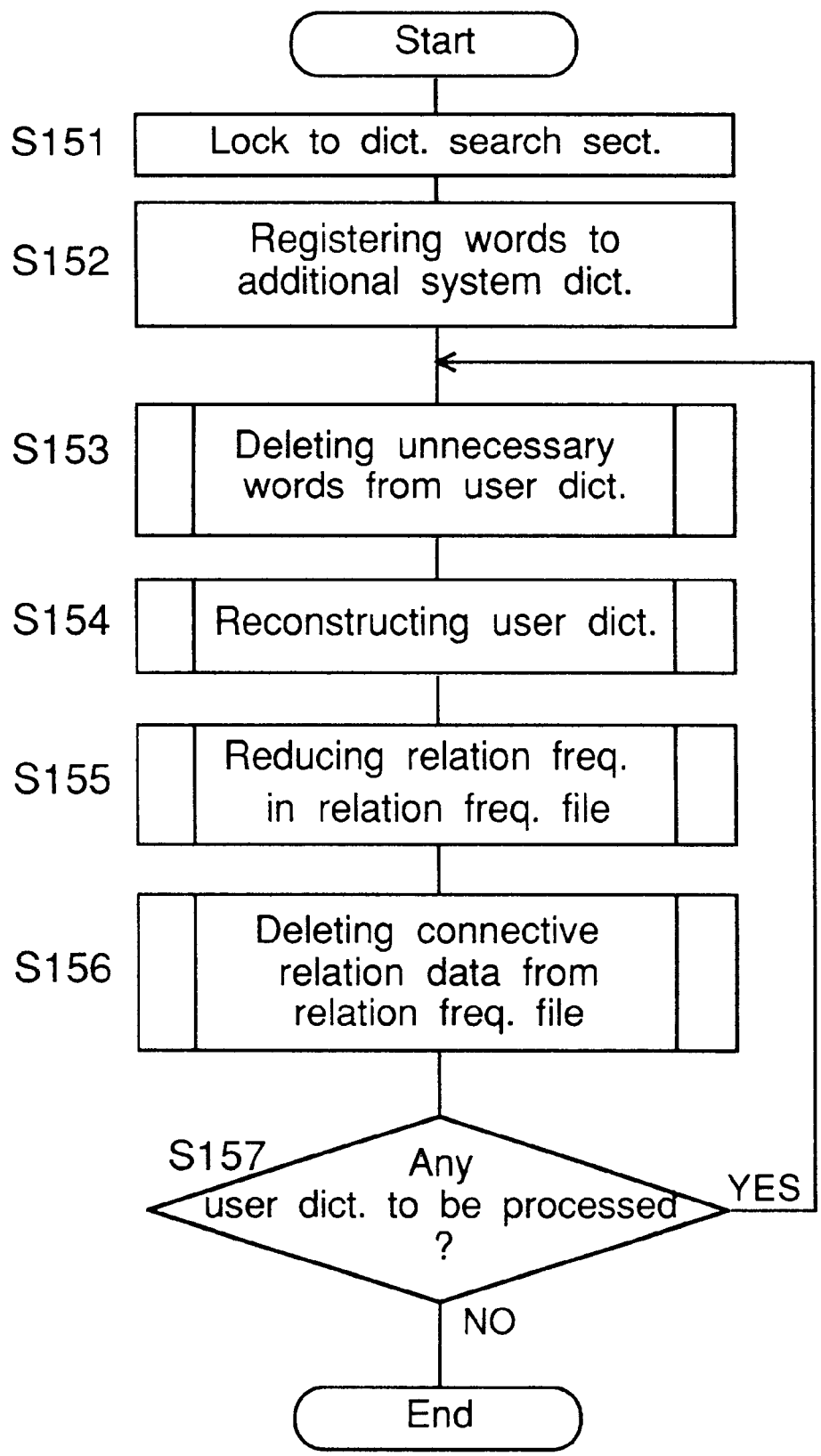
FIG. 28 is a flowchart showing the off-line learning processing in the fourth embodiment.

The offline learning processing is described with a flowchart. FIG. 28 is a flowchart illustrating the outline of offline learning processing. When the system load is light, for example during mid night, the offline learning processor 263 issues a lock instruction to the dictionary search section 261, after pre-set run time has passed, so that the dictionary search section 261 does not receive a search request from the input sentence determining processor 254 (S151). Also the offline learning processor 263 sends a message to the registration learning processor 264.

Next, the offline learning processor 263 issues an instruction to renew the pre-previous frequency file 271, previous frequency file 272, pre-previous relation frequency file 273, and previous relation frequency file 274. Then, the pre-previous frequency file 271 is renewed by copying the previous frequency file 272, and then the previous frequency file 272 is renewed by copying the frequency file 268. Then the pre-previous relation frequency file 273 is renewed by copying the previous relation frequency file 274, and then the previous relation frequency file 274 is renewed by copying the relation frequency file 269.

Next, the registration learning processor 264 takes the words registered in each user dictionary 267 such that their frequency values are greater than corresponding predetermined reference values to register in the supplementary system dictionary 266 (S152), and deletes these words from the user dictionary 267. This part of the processing has been detailed in the description of the third embodiment.

Next, by referring to the frequency file 268, previous frequency file 272, and pre-previous frequency file 273, the offline learning processor 263 deletes the words registered in the user dictionary 267 of user #1 such that their use frequency values are small (S153). This part of processing is detailed later.

The deletion of words creates fragmented spaces in the user dictionary 267 #1. Therefore, the offline learning processor 263 performs garbage collection to remove the fragmented empty areas and reconstruct the user dictionary 267 #1 (S154). This part of processing is detailed later.

After finishing the reconstruction of the user dictionary 267 #1, the offline learning processor 263 refers to the relation frequency values of connective relation records stored in the previous relation frequency file 274 and pre-previous frequency file 273 to reduce relation frequency values stored in the relation frequency file 269 if necessary (S155). This part of processing is detailed later.

Next, the offline learning processor 263 examines the relation frequency values of connective relation records registered in the relation frequency file 269 to delete the records having the relation frequency value 0 (S156). This part of the processing is also detailed later.

Next, the offline learning processor 263 judges whether a next user dictionary 267 to be processed exists or not (S157). Since a next user dictionary 267 #2 to be processed exists (YES in S157), the offline learning processor 263 returns to S153 and performs similar processing for the user dictionary 267 #2.

In this way, the offline learning processor 263 performs processing for the user dictionaries 267 #1 to #n (NO in S157).

In the following are described the step S153 that performs deletion of words, the step 154 that performs the reconstruction of the user dictionaries 267, the step S155 that reduces relation frequency values in the relation frequency file 269, and the step S156 that deletes connective relation records in the relation frequency file 269.

(a) Step S153 that performs deletion of words.

Figure 29:
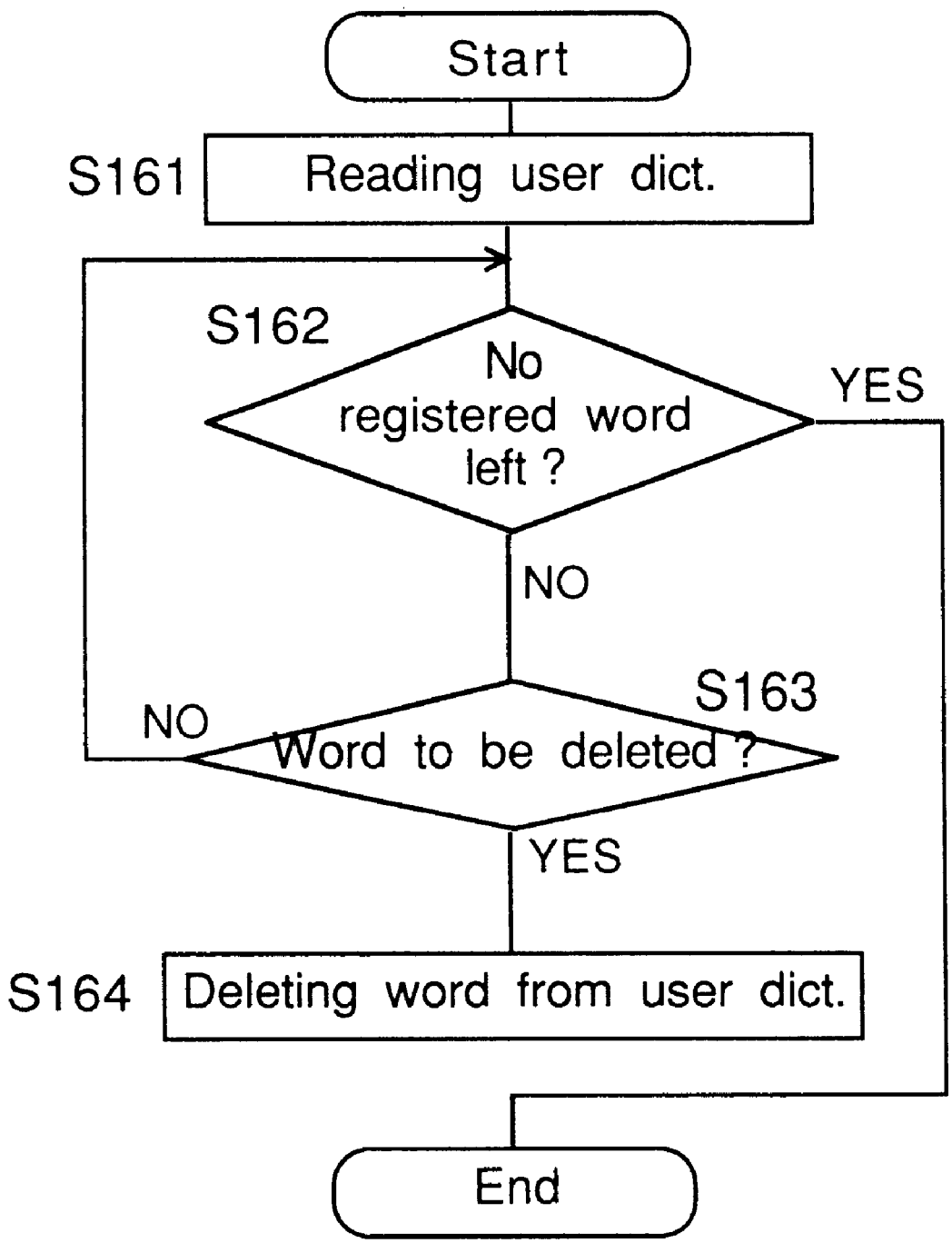
FIG. 29 is a flowchart showing the processing for deleting words from a user dictionary in the fourth embodiment.
Figure 30:
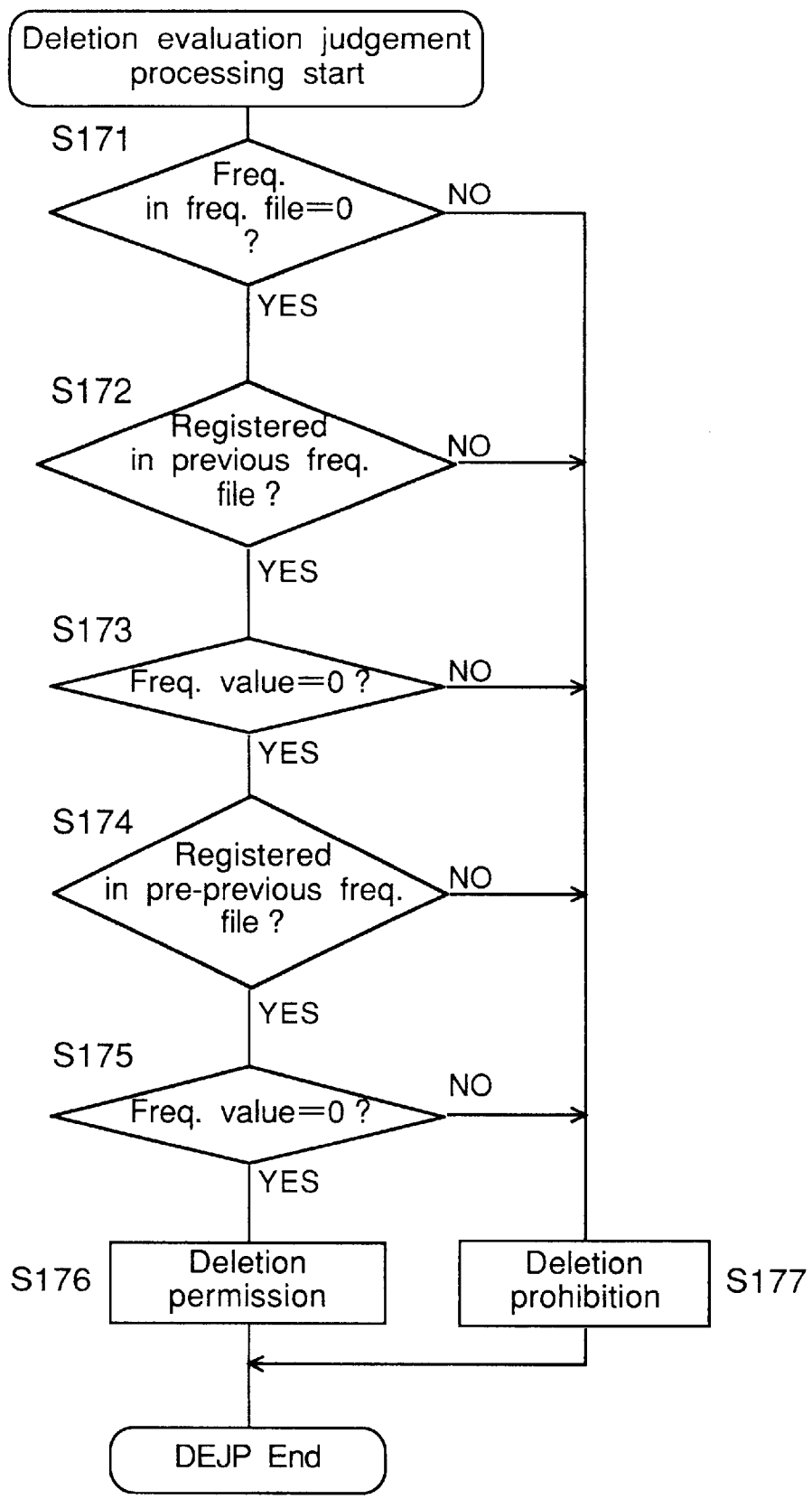
FIG. 30 is a flowchart showing the evaluation processing for the evaluation for deleting words from a user dictionary in the fourth embodiment.

The step S153 that performs deletion of words is described in conjunction with FIGS. 29 and 30. The offline learning processor 263 reads a user dictionary 267 (S161), examines whether all words registered in the user dictionary 267 have been evaluated (S162), and terminates the processing if all words have been evaluated (YES in S162).

On the other hand, if the offline learning processor 263 judges that not all words have been evaluated (NO in S162), then it examines the use frequency value of the currently considered word to evaluate whether the word should be deleted or not (S163). This routine is called deletion evaluation judgement processing hereafter and described later in conjunction with FIG. 30.

After finishing deletion evaluation judgement processing, the offline learning processor 263 deletes the considered word from the user dictionary 267 (S164), if it is a word to be deleted (YES in S163). If the considered word is not a word to be deleted (NO in S163), then the processing returns to step S162 to repeat the above processing for all words in the user dictionary 267.

The above deletion evaluation judgment processing is described in conjunction with FIG. 30. As shown in the figure, the offline learning processor 263 examines whether the frequency value of the considered word stored in the frequency area 682 of the frequency file 268 is 0 or not (S171). If the frequency value is not 0 (NO in S171), then the offline learning processor 263 evaluates the word as a word not to be deleted (S177), and terminates the deletion evaluation determining processing for that word.

On the other hand, if the frequency value is 0 (YES in S171), then the offline learning processor 263 judges whether the word is registered in the previous frequency file 272 (S172). If the word is not registered (NO in S172), then the offline learning processor 263 evaluates the word as a word not to be deleted (S177), and terminates the deletion evaluation determining processing for that word. If the word is registered (YES in S172), then the offline learning processor 263 examines whether the use frequency value of the word is 0 (S173).

If the use frequency value of the word is not 0 (NO in S173), then the offline learning processor 263 evaluates the word as a word no to be deleted (S177), and terminates the deletion evaluation determining processing for that word. If the use frequency value of the word is 0 (YES in S173), then the offline learning processor 263 judges whether the word is registered in the pre-previous frequency file 271 (S174).

If the word is not registered in the pre-previous frequency file 271 (NO in S174), then the offline learning processor 263 evaluates the word as a word not to be deleted (S177), and terminates the deletion evaluation determining processing for that word. If the word is registered (YES in S174), then the offline learning processor 263 examines whether the use frequency value of the word is 0 (S175).

If the use frequency value of the word is not 0 (NO in S175), then the offline learning processor 263 evaluates the word as a word not to be deleted (S177), and terminates the deletion evaluation determining processing for that word. If the use frequency value of the word is 0 (YES in S175), then the offline learning processor 263 evaluates the word as a deleted word (S176), and terminates the deletion evaluation determining processing for that word.

(b) Step S154 that performs the reconstruction processing of the user dictionaries 267.

Figure 31:
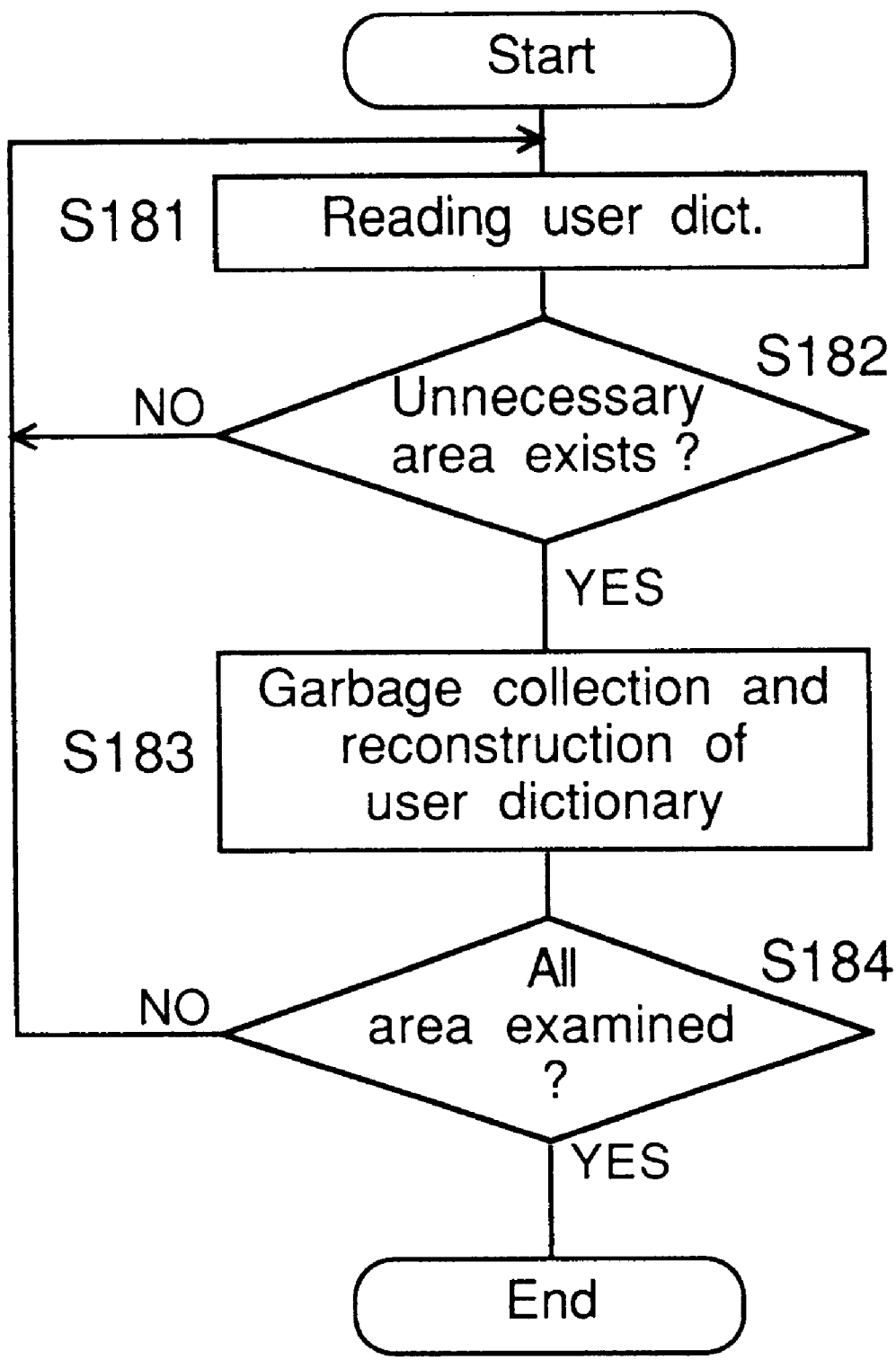
FIG. 31 is flowchart showing the processing for garbage collection for a user dictionary.

The step 154 that performs the reconstruction processing of the user dictionaries 267 is described in conjunction with the flowchart shown in FIG. 31. The offline learning processor 263 reads an area of a predetermined size starting at the first address of the user dictionary 267 (S181), and judges whether there exists in the area an unnecessary area, that is a fragmented empty area (S182).

If there exists no unnecessary area in the read area (NO in S182), then the offline learning processor 263 returns to step S181. If there exists an unnecessary area (YES in S182), then the offline learning processor 263 deletes the content of the unnecessary area and relocates the succeeding area to that area (garbage collection) to reconstruct the user dictionary 267 (S183).

After reconstructing the user dictionary 267 for the read area, the offline learning processor 263 judges whether it has examined the whole area of the user dictionary 267 (S184). If it has not examined the whole area (NO in S184), then it returns to step S181. If it has examined the whole area, then it terminates the processing.

(c) Step S155 that reduces relation frequency values in the relation frequency file 269.

Figures 32, 33:
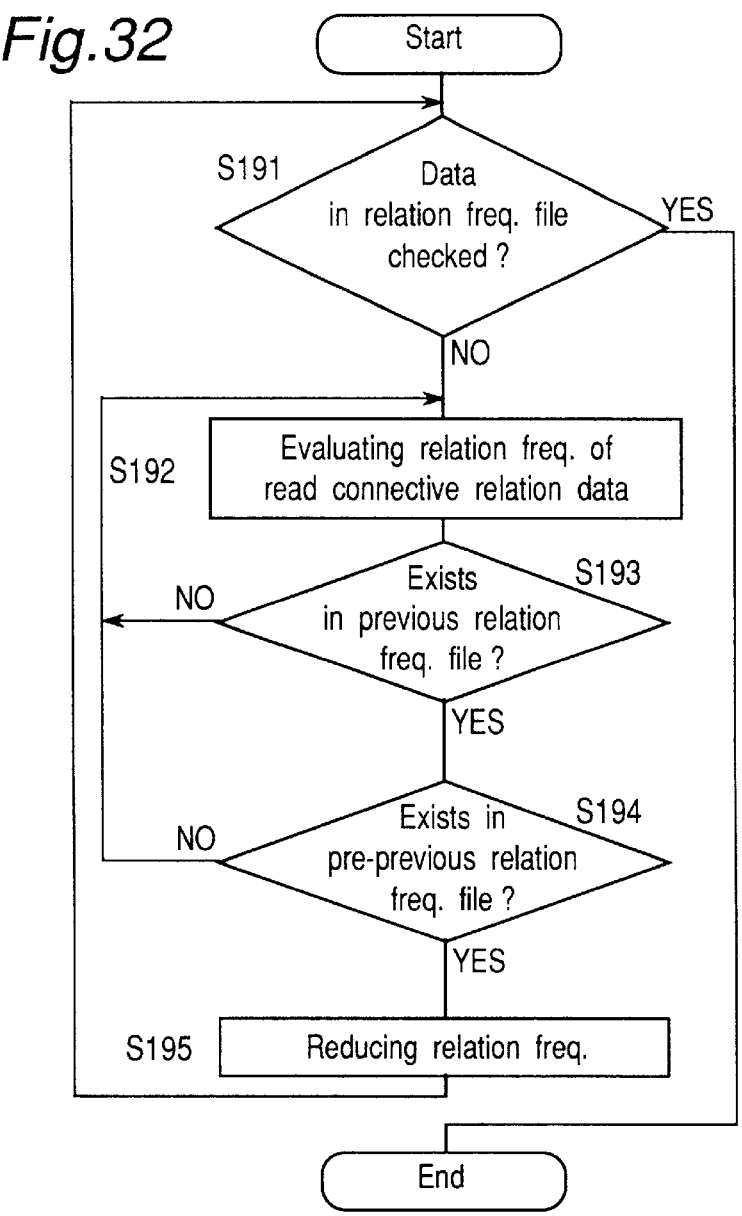
FIG. 32 is a flowchart of processing for reducing relation frequency values registered in the connective frequency file in the fourth embodiment.
FIG. 33 is a diagram showing transitions of relation frequency values.

Referring to the flowcharts of FIGS. 32 and 33, the step S155 that reduces relational frequency values in the relation frequency file 269 is described. The offline learning processor 263 judges whether it has examined all connective relation records in the relation frequency file 269 (S191). If it has examined all (YES in S191), it terminates the processing. If it has not examined all (NO in S191), then it examines the relation frequency value of the connective relation record under consideration (S192).

Next, the offline learning processor 263 examines whether the relation frequency value of the connective relation record under consideration exists in the previous relation frequency file 273 (S193). If the relation frequency value does not exist in the previous relation file 273 (NO in S193), then the offline learning processor 263 returns to step S192. If the relation frequency value exists in the previous relation frequency file 273 (Y in S193), then the offline learning processor examines whether the relation frequency value of the connective relation record under consideration exists in the pre-previous relation frequency file 274 (S194).

If the relation frequency value does not exist in the pre-previous relation frequency file 274 (NO in S194), then the offline learning processor 263 returns to step S192. If the relation frequency value exists in the pre-previous relation frequency file 274 (YES in S194), then the offline learning processor 263 reduces the relation frequency value of the connective relation record by a predetermined amount (S195) and returns to step S191.

The above processing is described in more detail in conjunction with FIG. 33. FIG. 33 shows transitions of relation frequency values. As shown in FIG. 33, reduction operation for the use frequency value is performed only in the cases of patterns 1 and 2.

In the pattern 1, the relation frequency value of a connective relation record in the pre-previous relation frequency file 273, the previous relation frequency file 272, and the relation frequency file 269 are the same. The reason is that the connective relation record has never been used. In the pattern 2, the relation frequency value of a connective relation record was once reduced and has not been changed since then. The reason is that the connective relation record has never been used as in the pattern 1.

(d) Step S156 that deletes connective relation records in the relation frequency file 269.

Figure 34:
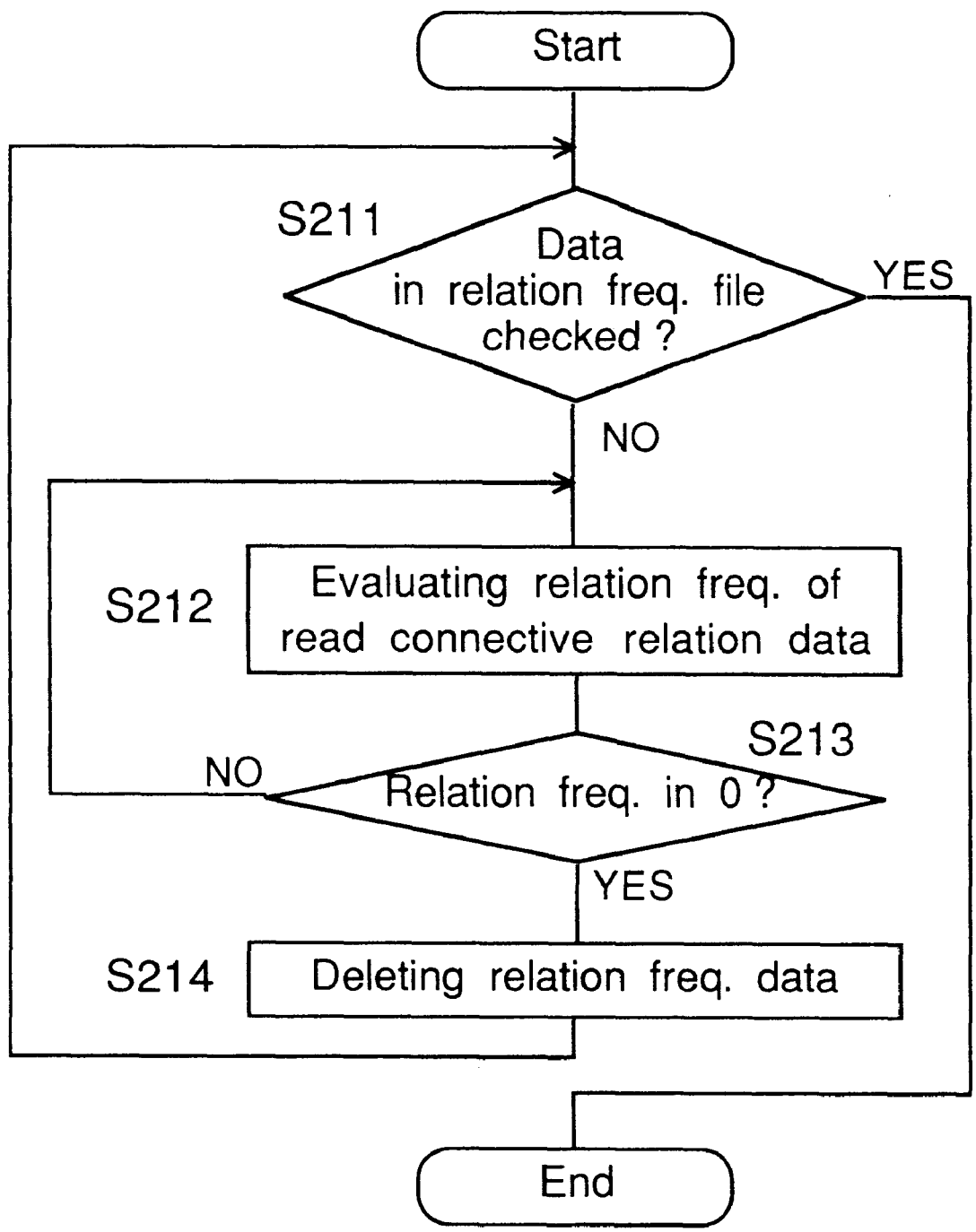
FIG. 34 is a flowchart showing the processing for deleting connective relation records registered in the relation frequency file in the fourth embodiment.

The step S156 that deletes connective relation records in the relation frequency file 269 is described in conjunction with the flowchart of FIG. 34. The offline learning processor 263 judges whether it has examined all connective relation records (S211). If it has examined all (YES in S211), then it terminates the processing. On the other hand, if it has not examined all (NO in S211), then it examines the relation frequency value of connective relation record under consideration (S212).

Next, the offline learning processor 263 examines whether the relation frequency value is 0 or not (S213). If the relation frequency value is not 0 (NO in S213), then the offline learning processor 263 returns to 212. If the relation frequency value is 0 (YES in S213), then the offline learning processor 263 deletes the connective relation record (S214).

According to the invention described above, it judges whether the registered frequency value of a word registered in a user dictionary is greater than a predetermined reference value. If the frequency value is greater than the predetermined reference value, then the present invention registers the word in the supplementary system dictionary. Therefore, a plurality of users do not need to newly register the same word. Further, the efficiency of conversion is increased, when a user who has not registered a word uses the word for the first time.

Further after a word is registered in the supplementary system dictionary, the word is deleted from the user dictionary, so that the data area of the user dictionary can be saved. Consequently, the present invention can perform other processing using the saved area.

Further, the present invention judges whether the use frequency value of a word registered in a user dictionary is greater than a predetermined reference value. If the use frequency value is not greater than the predetermined reference value, then the word is deleted from the user dictionary. Consequently, the present invention automatically deletes words that have been registered by a user but not been used by the user to use the memory resource effectively and to increase conversion efficiency.

In particular, the present invention automatically deletes a word from the user dictionaries, if the processing load of the word is less than a predetermined reference value. Similarly, the present invention automatically deletes a connective relation record from the relation frequency file, if the processing load of the connective relation record is less than a predetermined reference value. Consequently, the present invention can use the memory resource effectively and increase conversion efficiency.

Although the present invention has been fully described in connection with the preferred embodiments thereof with reference made to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A character processing apparatus comprising a plurality of client apparatuses, each having its own user dictionary, and a server apparatus having a shared dictionary that is used in sharing by said client apparatus, comprising:

a reference value storage means that stores a reference value for selecting words from the words stored in a user dictionary to store in said shared dictionary, a use frequency recording means that records the use frequency value of each word registered in a user dictionary, and a registration means that judges whether the use frequency value recorded by said use frequency recording means of a word registered in a user dictionary is greater than the reference value stored in said reference value storage means and registers the word in said shared dictionary if the use frequency value is greater than said reference value.

2. A character processing apparatus defined in claim 1 further comprising a word deletion means that deletes a word from user dictionaries after the word is registered in said shared dictionary by said registration means.

3. A character processing apparatus defined in claim 1 or claim 2 being characterized in that said reference value and said use frequency value of a word are the numbers of user dictionaries in which said word is stored.

4. A character processing apparatus defined in claim 1 or claim 2 being characterized in that said reference value and said use frequency value of a word are the sums of the numbers of user dictionaries in which the word is stored and the priority values at the time when a word is read out from a user dictionary.

5. A character processing apparatus defined in one of claims 1 to 4 further comprising a reference value altering means that alters the reference value of said reference value storage means.

6. A character processing apparatus defined in one of claims 1 to 4 being characterized in that said shared dictionary is divided into a part such that no additional registration or deletion is allowed and a part such that additional registration and deletion are allowed.

7. A character processing apparatus having client apparatuses and a server apparatus having user dictionaries, each being used by a particular user, and a shared dictionary that is used in sharing by users, comprising:

a reference value storage means that stores a reference value for selecting words from words stored in a user dictionary to store in said shared dictionary, a word use frequency recording means that records the use frequency value of each word registered in a user dictionary, a registration means that judges whether the use frequency value recorded by said word use frequency recording means of a word registered in a user dictionary is greater than the reference value stored in said reference value storage means and registers the word in said shared dictionary if the use frequency value is greater than said reference value, and a word deleting means that judges whether the use frequency value recorded by said word use frequency recording means of a word registered in a user dictionary is greater than a predetermined reference value and deletes the word from the user dictionary if the use frequency value is less than or equal to said predetermined reference value.

8. A character processing apparatus defined in claim 7 being characterized in that said word deleting means judges whether the use frequency value of a word registered in a user dictionary recorded by said word use frequency recording means is greater than a predetermined reference value, deletes the word from the user dictionary if the use frequency value is not greater than said predetermined reference value, and deletes a word from user dictionaries after said registration means registers the word in said shared dictionary.

9. A character processing apparatus defined in claim 8 further comprising:

a connective relation data use frequency recording means that stores the use frequency value of a connective relation record that has a connective relation between words, and a connective relation data deleting means that judges whether the use frequency value of a connective relation record stored in said connective relation data use frequency recording means is greater than a predetermined reference value, deletes the connective relation record from said connective relation use frequency recording means if the use frequency value is not greater than said predetermined reference value.

10. A character processing apparatus defined in claim 8 or claim 9 being characterized in that said word deleting means automatically deletes a word from a user dictionary, if the processing load of the word is not greater than a predetermined reference value.

11. A character processing apparatus defined in claim 8 or claim 9 being characterized in that said connective relation data deleting means automatically deletes a connective relation record from said connective relation data use frequency recording means, if the processing load of the connective relation record is not greater than a predetermined reference value.

12. A character processing method in a character processing system equipped with a plurality of client apparatuses, each having its own user dictionary, and a server apparatus having a shared dictionary that is used in sharing by said client apparatus, being characterized in that:

stores a reference value for selecting words from words stored in a user dictionary to store in said shared dictionary, records the use frequency value of each word registered in a user dictionary, judges whether the use frequency value of a word registered in a user dictionary is greater than said reference value, and registers the word in said shared dictionary if the use frequency value is greater than said reference value.

13. A character processing method defined in claim 12 being characterized in that deletes a word from user dictionaries after said word is registered in said shared dictionary.

14. A character processing method defined in claim 12 or claim 13 being characterized in that said reference value and said use frequency value of a word are the numbers of user dictionaries in which said word is stored.

15. A character processing method defined in claim 12 or claim 13 being characterized in that said reference value and the use frequency value of a word are the sums of the numbers of user dictionaries in which said word is stored and the priority values at the time when a word is read out of a user dictionary.

16. A character processing method in a character processing system equipped with client apparatus and a server apparatus having user dictionaries, each being used by a particular user, and a shared dictionary that is used in sharing by users, being characterized by the steps of that:

storing a reference value for selecting words from words stored in a user dictionary to store in said shared dictionary, recordind the use frequency value of each word registered in a user dictionary, judging whether the use frequency value of a word registered in a user dictionary is greater than said stored reference value, registering the word in said shared dictionary if the use frequency value is greater than said reference value, judging whether the use frequency value of a word registered in a user dictionary is greater than a predetermined reference value, and deleting the word from the user dictionary if the use frequency value is not greater than said predetermined reference value.

17. A character processing method defined in claim 16, further comprising the steps of:

judging whether the use frequency value of a word registered in a user dictionary is greater than a predetermined reference value, deleting the word from the user dictionary if the use frequency value is not greater than said predetermined reference value, and deleting a word from user dictionaries after registering the word in said shared dictionary.

18. A character processing method defined in claim 16 or claim 17, further comprising the steps of:

storing in a file the use frequency value of a connective relation record that has a connective relation between words, judging whether the use frequency value of a connective relation record stored in said file is greater than a predetermined reference value, and deleting the connective relation record from said file if the use frequency value is not greater than said predetermined reference value.

19. A character processing method defined in claim 16 or claim 17, wherein said character processing system automatically deletes a word from a user dictionary, if the processing load of the word is not greater than a predetermined reference value.

20. A character processing method defined in claim 18, wherein said character processing system automatically deletes a connective relation record from a file in which the use frequency value of said connective relation record is stored, if the processing load of said connective relation record is not greater than a predetermined reference value.

* * * * *